US011070126B2

(12) United States Patent
Nishimoto et al.

(10) Patent No.: US 11,070,126 B2
(45) Date of Patent: Jul. 20, 2021

(54) POWER SUPPLY CIRCUIT HAVING IMPROVED NOISE SUPPRESSION

(71) Applicant: PANASONIC INTELLECTUAL PROPERTY MANAGEMENT CO., LTD., Osaka (JP)

(72) Inventors: Taiki Nishimoto, Osaka (JP); Noriaki Takeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/608,717

(22) PCT Filed: Apr. 26, 2018

(86) PCT No.: PCT/JP2018/016962
§ 371 (c)(1),
(2) Date: Oct. 25, 2019

(87) PCT Pub. No.: WO2018/199223
PCT Pub. Date: Nov. 1, 2018

(65) Prior Publication Data
US 2021/0006152 A1    Jan. 7, 2021

(30) Foreign Application Priority Data
Apr. 28, 2017  (JP) .............................. JP2017-090151

(51) Int. Cl.
*H02M 1/42*  (2007.01)
*H02M 1/00*  (2006.01)

(52) U.S. Cl.
CPC ........ *H02M 1/4225* (2013.01); *H02M 1/0022* (2021.05); *H02M 1/0058* (2021.05)

(58) Field of Classification Search
CPC .......................................... H02M 1/42–1/4266
See application file for complete search history.

(56) References Cited

U.S. PATENT DOCUMENTS

| | | | |
|---|---|---|---|
| 2007/0262752 A1* | 11/2007 | Gaikwad ............. | H02M 1/4225 323/207 |
| 2010/0097041 A1* | 4/2010 | Ayukawa ................ | H02M 7/23 323/272 |

(Continued)

FOREIGN PATENT DOCUMENTS

| | | |
|---|---|---|
| CN | 105634399 A | 6/2016 |
| CN | 106100313 A | 11/2016 |
| JP | 2007-195282 A | 8/2007 |

OTHER PUBLICATIONS

International Search Report and Written Opinion issued in International Patent Application No. PCT/JP2018/016962, dated Jun. 26, 2018; with partial English translation.

*Primary Examiner* — Rafael O De Leon Domenech
(74) *Attorney, Agent, or Firm* — McDermott Will and Emery LLP

(57) ABSTRACT

Provided is a power supply circuit in which a first end of a first inductor is connected to a path linking a first input terminal to a first connection point, a second end of the first inductor is connected to a first end of a bypass capacitor, a first end of a second inductor is connected to a path linking the first input terminal to a second connection point, a second end of the second inductor is connected to a first end of the bypass capacitor, a second end of the bypass capacitor is connected to a second output terminal, a first reactor and the first inductor are magnetically coupled to each other, a second reactor and the second inductor are magnetically coupled to each other, and a control circuit performs switching control over a first switching element and a second switching element, using an interleaving method.

10 Claims, 21 Drawing Sheets

(56) References Cited

U.S. PATENT DOCUMENTS

| | | | |
|---|---|---|---|
| 2012/0039094 A1* | 2/2012 | Shin | H02M 1/4225 |
| | | | 363/21.04 |
| 2014/0160815 A1* | 6/2014 | Jeong | G05F 1/70 |
| | | | 363/84 |
| 2016/0172975 A1* | 6/2016 | Takeya | H02M 1/12 |
| | | | 363/126 |
| 2016/0276924 A1* | 9/2016 | Castelli | H02M 3/33515 |
| 2016/0315552 A1 | 10/2016 | Nishimoto et al. | |
| 2017/0310209 A1* | 10/2017 | Terui | H02M 3/00 |

\* cited by examiner

POWER SUPPLY CIRCUIT HAVING IMPROVED NOISE SUPPRESSION

CROSS-REFERENCE OF RELATED APPLICATIONS

This application is the U.S. National Phase under 35 U.S.C. § 371 of International Patent Application No. PCT/JP2018/016962, filed on Apr. 26, 2018, which in turn claims the benefit of Japanese Application No. 2017-090151, filed on Apr. 28, 2017, the entire disclosures of which Applications are incorporated by reference herein.

TECHNICAL FIELD

The present disclosure relates to a power supply circuit that generates a predetermined voltage and a predetermined current.

BACKGROUND ART

Patent Literature 1 discloses a power supply device that reduces ripple components constituting a noise, by performing switching control using an interleaving method.

However, in the conventional technique, there is a demand to further reduce noises with frequencies equal to an even multiple of a switching frequency.

CITATION LIST

Patent Literature

Patent Literature 1: JP 2007-195282 A

SUMMARY OF INVENTION

A power supply circuit according to one aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lc2); and a bypass capacitor (Cb3). In the power supply circuit, the first input terminal (3a) is connected to a first end of the first reactor (Lr1), a second end of the first reactor (Lr1) is connected to a first end of the third switching element (S1), and a second end of the third switching element (S1) is connected to the first output terminal (5a), the first input terminal (3a) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to a first connection point (4a) on a path linking the second end of the first reactor (Lr1) to the first end of the third switching element (S1), and a second end of the first switching element (Sw1) is connected to the second output terminal (5b), a first end of the second switching element (Sw2) is connected to a second connection point (4c) on a path linking the second end of the second reactor (Lr2) to the first end of the fourth switching element (S2), and a second end of the second switching element (Sw2) is connected to the second output terminal (5b), a first end of the first capacitor (C1) is connected to the first output terminal (5a), and a second end of the first capacitor (C1) is connected to the second output terminal (5b), a first end of the first inductor (Lc1) is connected to a path linking the first input terminal (3a) to the first connection point (4a), and a second end of the first inductor (Lc1) is connected to a first end of the bypass capacitor (Cb3), a first end of the second inductor (Lc2) is connected to a path linking the first input terminal (3a) to the second connection point (4c), and a second end of the second inductor (Lc2) is connected to the first end of the bypass capacitor (Cb3), a second end of the bypass capacitor (Cb3) is connected to the second output terminal (5b), the first reactor (Lr1) and the first inductor (Lc1) are magnetically coupled to each other, and the second reactor (Lr2) and the second inductor (Lc2) are magnetically coupled to each other, and the control circuit (9) performs switching control over the first switching element (Sw1) and the second switching element (Sw2), using an interleaving method.

A power supply circuit according to another aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lc2); a first bypass capacitor (01); and a second bypass capacitor (Cb2). In the power supply circuit, the first input terminal (3a) is connected to a first end of the first reactor (Lr1), a second end of the first reactor (Lr1) is connected to a first end of the third switching element (S1), and a second end of the third switching element (S1) is connected to the first output terminal (5a), the first input terminal (3a) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to a first connection point (4a) on a path linking the second end of the first reactor (Lr1) to the first end of the third switching element (S1), and a second end of the first switching element (Sw1) is connected to the second output terminal (5b), a first end of the second switching element (Sw2) is connected to a second connection point (4c) on a path linking the second end of the second reactor (Lr2) to the first end of the fourth switching element (S2), and a second end of the second switching element (Sw2) is connected to the second output terminal (5b), a first end of the first capacitor (C1) is connected to the first output terminal (5a), and a second end of the first capacitor (C1) is connected to the second output terminal (5b), a first end of the first inductor (Lc1) is connected to a path linking the first input terminal (3a) to the first connection point (4a), a second end of the first inductor (Lc1) is connected to a first end of the first bypass capacitor (Cb1), and a second end of the first bypass capacitor (Cb1) is connected to the second output terminal (5b), a first end of the second inductor (Lc2) is connected to a path linking the first input terminal (3a) to the second connection point (4c), a second end of the second inductor (Lc2) is connected to a first end of the second bypass capacitor (Cb2), and a second end of the second bypass capacitor (Cb2) is connected to the second output terminal (5b), the first reactor (Lr1) and the first inductor (Lc1) are magnetically coupled to each other, and the second reactor (Lr2) and the second inductor (Lc2)

are magnetically coupled to each other, and the control circuit (9) performs switching control over the first switching element (Sw1) and the second switching element (Sw2), using an interleaving method.

According to the present disclosure, noises with frequencies equal to an even multiple of a switching frequency can be further reduced.

DESCRIPTION OF EMBODIMENTS (Knowledge Underlying the Present Disclosure)

Figure 14:
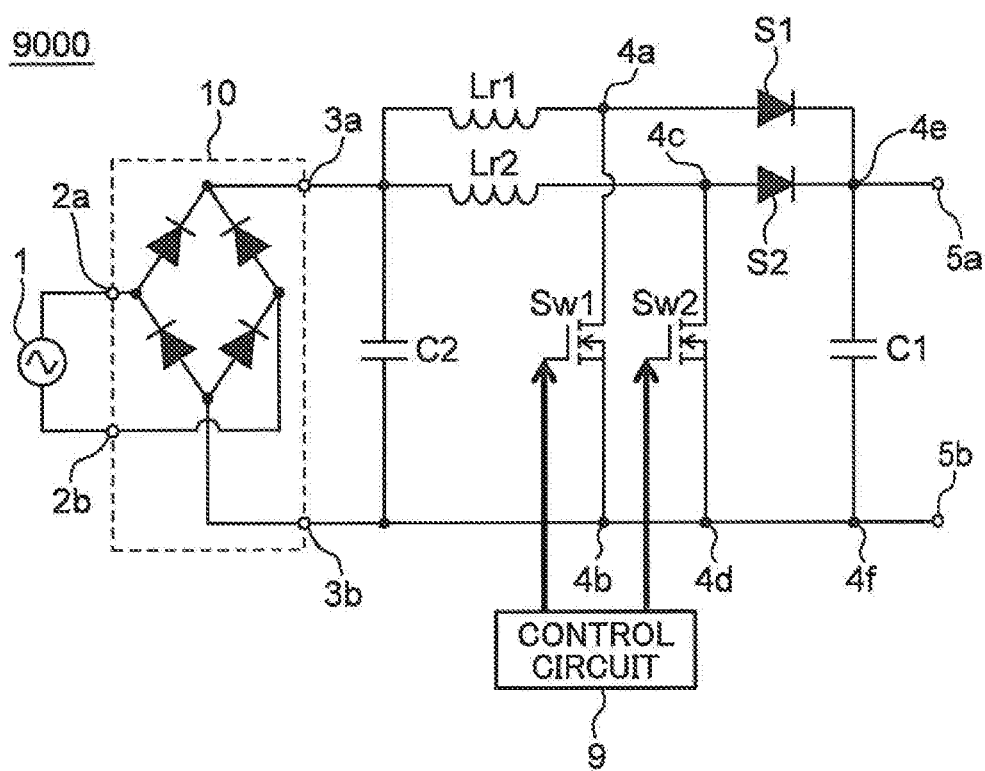
FIG. 14 is a circuit diagram showing a schematic configuration of a power factor improving circuit of a comparative example which performs switching control using an interleaving method.

Knowledge underlying the present disclosure will first be described. FIG. 14 is a circuit diagram showing a schematic configuration of a power factor improving circuit 9000 of a comparative example which performs switching control using an interleaving method. The power factor improving circuit 9000 shown FIG. 14 that performs switching control, using the interleaving method, similarly to the power supply device disclosed in Patent Literature 1 has been conventionally known.

Specifically, in the power factor improving circuit 9000, an AC voltage from an AC power supply 1 is applied across a first input end 2a and a second input end 2b of a rectifying section 10. The applied AC voltage is rectified by the rectifying section 10 into a DC voltage, which is then applied across a first input terminal 3a and a second input terminal 3b.

A first switching element Sw1 and a second switching element Sw2 are subjected to switching control by a control circuit 9 using the interleaving method. Specifically, under such switching control, the first switching element Sw1 and the second switching element Sw2 are switched on and off at the same switching frequency (which will hereinafter be referred to as switching frequency fsw) such that the first switching element Sw1 and the second switching element Sw2 are different in phase by 180 degrees from each other.

A third switching element S1 is switched off when the first switching element Sw1 is switched on, and is switched on when the first switching element Sw1 is switched off. Likewise, a fourth switching element S2 is switched off when the second switching element Sw2 is switched on, and is switched on when the second switching element Sw2 is switched off. Hereinafter, operations of the first and second switching elements Sw1 and Sw2 under the switching control by the control circuit 9 using the interleaving method will be referred to as interleaving operations.

When the first switching element Sw1 is on, current energy is accumulated at a first reactor Lr1. When the third switching element S1 is on, current energy is transferred from the first reactor Lr1 to a first capacitor C1. When the second switching element Sw2 is on, current energy is accumulated at a second reactor Lr2. When the fourth switching element S2 is on, current energy is transferred from the second reactor Lr2 to the first capacitor C1. As a result of these actions, a DC voltage develops between a first output terminal 5a and a second output terminal 5b of the power factor improving circuit 9000.

The first reactor Lr1 and the second reactor Lr2 accumulate and release current energy repeatedly. As a result, currents flowing through the first reactor Lr1 and the second reactor Lr2 take waveforms having large triangular-wave-shaped ripples. These triangular-wave-shaped ripples propagate as a noise to, for example, the AC power supply 1 or the like.

Based on its propagation characteristics, a noise is classified into a normal mode noise and a common mode noise. A normal mode noise is a noise that circulates through a power line loop. A common mode noise is a noise that propagates through a plurality of power lines at the same phase and returns to the power supply by propagating through a neutral line at the phase reverse to the same phase. Triangular-wave-shaped ripples propagate as a normal mode noise.

Figure 15:
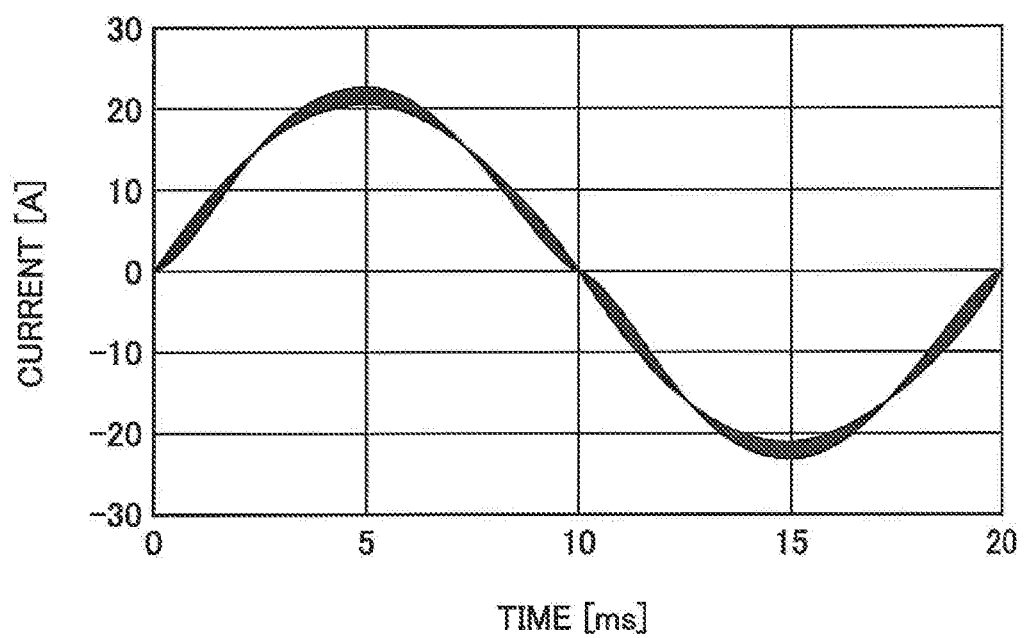
FIG. 15 is a graph showing a calculation result obtained by a circuit simulation of a power current in the power factor improving circuit shown in FIG. 14.

FIG. 15 is a graph showing a calculation result obtained by a circuit simulation of a power current in the power factor improving circuit 9000. A segment of a power current waveform shown in FIG. 15, the segment in a period from time 5 ms to time 5.1 ms, is extracted and shown in an enlarged form in FIG. 16.

In the circuit simulation, the inductance of the first reactor Lr1 and of the second reactor Lr2 is determined to be 200 uH. The capacitance of an X-capacitor C2 is determined to be 400 nF. The switching frequency fsw is determined to be 100 kHz. The frequency and the effective value of the AC voltage supplied from the AC power supply 1 are determined to be 50 Hz and 200 V, respectively. The DC voltage that develops between the first output terminal 5a and the second output terminal 5b is determined to be 400 V.

Figure 16:
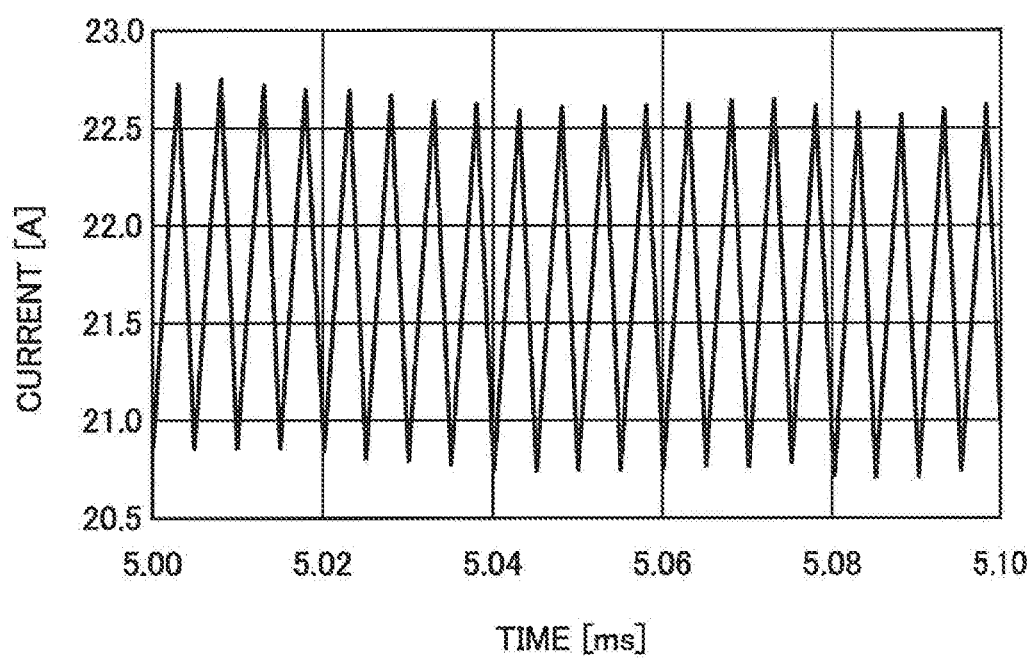
FIG. 16 is a graph showing an enlarged view of a segment of a power current waveform shown in FIG. 15, the segment being in a specific period.

According to the power factor improving circuit 9000, out of frequency components included in the generated triangle-wave-shaped ripples, frequency components equal to odd multiples of (one time, three times, . . . ) the switching frequency fsw are canceled out by interleaving operations. According to the power factor improving circuit 9000, however, frequency components equal to even multiples of (two times, four times, . . . ) the switching frequency fsw are not canceled out. As a result, as shown in FIGS. 15 and 16, the power current has a waveform of a sine wave having noises superimposed thereon.

To suppress a noise propagating to the power supply, a noise filter circuit may be provided between the power supply 1 and the rectifying section 10. This, however, raises a concern that the size of the power factor improving circuit 9000 may increase. Due to circuit layout requirements, the noise filter circuit may be mounted on a board separated from the power factor improving circuit 9000. This may raise a concern that a physical range in which a normal mode noise propagates becomes larger. As a result, a noise may enter a detection circuit used for circuit control, posing a high risk of causing circuit malfunctioning. Another problem may arise in a case where a normal mode noise is transformed into a common mode noise in a noise propagation path. In this case, the noise propagation path becomes complicated, leading to difficulty in carrying out noise preventing measures.

Figure 17:
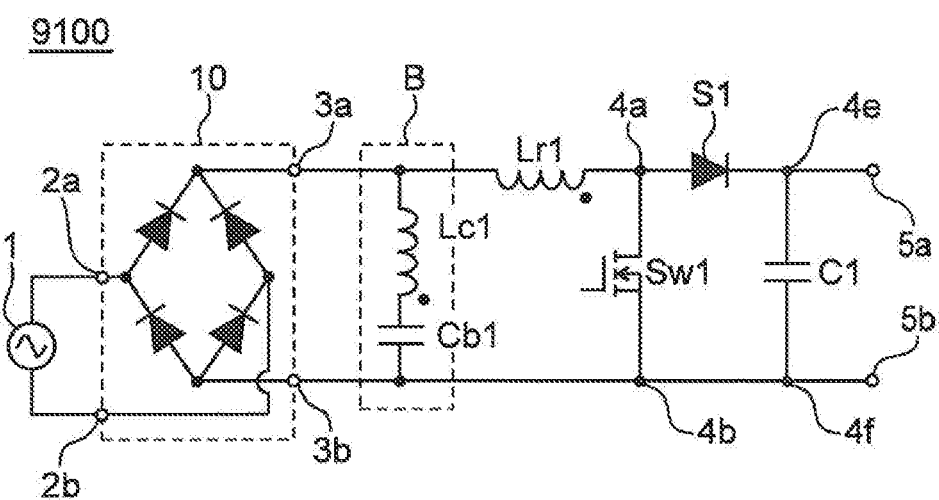
FIG. 17 is a circuit diagram showing a schematic configuration of a power factor improving circuit provided as another comparative example different from the power factor improving circuit shown in FIG. 14.
Figure 18:
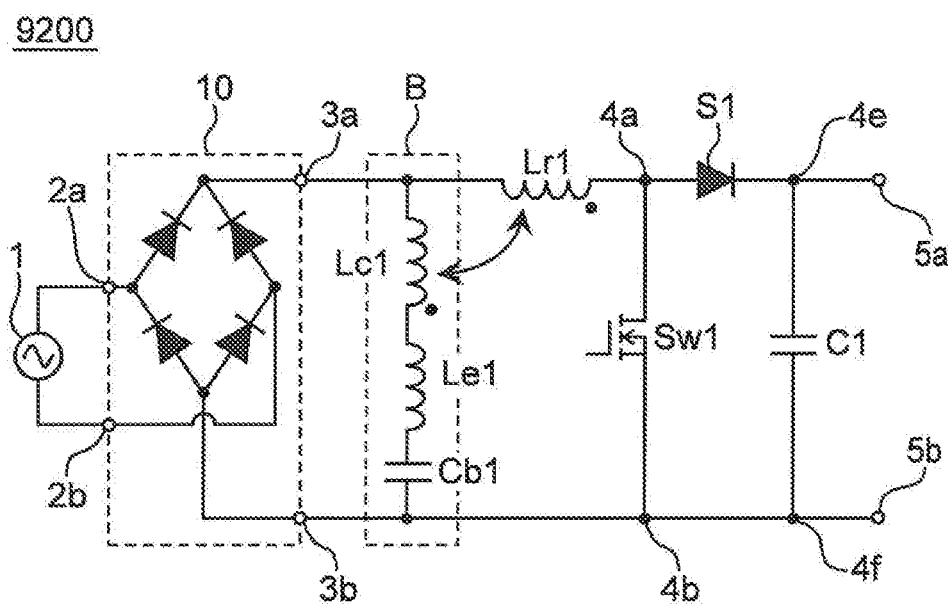
FIG. 18 is a circuit diagram showing a schematic configuration of a power factor improving circuit provided as still another comparative example different from the power factor improving circuits shown in FIGS. 14 and 17.

Meanwhile, power factor improving circuits 9100 and 9200 have been known as conventional power factor improving circuits that do not perform switching control using the interleaving method but reduce a normal mode noise with a frequency equal to the switching frequency fsw by a bypass circuit B, as shown in FIGS. 17 and 18. FIG. 17 is a circuit diagram showing a schematic configuration of the power factor improving circuit 9100 provided as another comparative example different from the power factor improving circuit 9000 shown in FIG. 14. FIG. 18 is a circuit diagram showing a schematic configuration of the power factor improving circuit 9200 provided as still another comparative example different from the power factor improving circuits 9000 and 9100 shown in FIGS. 14 and 17.

Specifically, as shown in FIGS. 17 and 18, the power factor improving circuits 9100 and 9200 each include the bypass circuit B having both ends connected respectively to the first input terminal 3a and the second input terminal 3b. The bypass circuit B has a first inductor Lc1 magnetically coupled to the first reactor Lr1, and a first bypass capacitor Cb1 connected in series to the first inductor Lc1. The bypass circuit B included in the power factor improving circuit 9200 (FIG. 18) has a first bypass inductor Le1 disposed between the first inductor Lc1 and the first bypass capacitor Cb1.

In the power factor improving circuits 9100 and 9200, because the first reactor Lr1 and the first inductor Lc1 are magnetically coupled to each other, a current flowing through the first reactor Lr1 excites a voltage across both terminals of the bypass capacitor Cb1, causing the voltage to oscillate. Hence part of a ripple component included in the current flowing through the first reactor Lr1 is supplied from the bypass circuit B.

As a result, part of a ripple component included in a current flowing through at least one of the first reactor Lr1, the first switching element Sw1, and the third switching element S1 is canceled out by a ripple component included in a current supplied from the bypass circuit B. In this manner, the power factor improving circuits 9100 and 9200 reduce the above triangular-wave-shaped ripples flowing out toward the AC power supply 1 as a normal mode noise.

The frequency of a ripple component to be canceled out can be adjusted properly depending on constants of electrical elements included in the bypass circuit B. For example, a case is assumed where a ripple component with a frequency equal to the switching frequency fsw of the first switching element Sw1 is canceled out. In this case, a current flowing through the first bypass capacitor Cb1, the current having a frequency equal to the switching frequency fsw, needs to match a current flowing through the first reactor Lr1, the current having a frequency equal to the switching frequency fsw. Specifically, the following formula (10) needs to be satisfied.

[Mathematical Formula 1]

$$f_{sw} = \frac{1}{2\pi \sqrt{C_b(L_c + L_e - k\sqrt{L_r L_c})}} \quad (10)$$

In the formula (10), the left side expresses the frequency of the ripple component to be canceled out. In this specific example, the frequency of the ripple component to be canceled out is the switching frequency fsw. Cb denotes the capacitance of the first bypass capacitor Cb1. Lr denotes the inductance of the first reactor Lr1. Lc denotes the inductance of the first inductor Lc1. Le denotes the inductance of the first bypass inductor Le1. The power factor improving circuit 9100 does not include the first bypass inductor Le1. Therefore, when the bypass circuit B of the power factor improving circuit 9100 is configured, Le=0 in the formula (10). Also, k denotes a coupling factor for the magnetic coupling between the first reactor Lr1 and the first inductor Lc1.

As described above, according to the power factor improving circuits 9100 and 9200, when the bypass circuit B is configured using electrical elements that satisfy the formula (10), a noise with a frequency equal to the switching frequency fsw can be reduced. However, noises with other frequencies cannot be reduced sufficiently.

Based on the above knowledge, the present inventors have devised configurations disclosed herein.

Solving the Problem

A power supply circuit according to one aspect of the present disclosure includes a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lc2); and a bypass capacitor (Cb). In the power supply circuit, the first input terminal (3a) is connected to a first end of the first reactor (Lr1), a second end of the first reactor (Lr1) is connected to a first end of the third switching element (S1), and a second end of the third switching element (S1) is connected to the first output terminal (5a), the first input terminal (3a) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to a first connection point (4a) on a path linking the second end of the first reactor (Lr1) to the first end of the third switching element (S1), and a second end of the first switching element (Sw1) is connected to the second output terminal (5b), a first end of the second switching element (Sw2) is connected to a second connection point (4c) on a path linking the second end of the second reactor (Lr2) to the first end of the fourth switching element (S2), and a second end of the second switching element (Sw2) is connected to the second output terminal (5b), a first end of the first capacitor (C1) is connected to the first output terminal (5a), and a second end of the first capacitor (C1) is connected to the second output terminal (5b), a first end of the first inductor (Lc1) is connected to a path linking the first input terminal (3a) to the first connection point (4a), and a second end of the first inductor (Lc1) is connected to a first end of the bypass capacitor (Cb), a first end of the second inductor (Lc2) is connected to a path linking the first input terminal (3a) to the second connection point (4c), and a second end of the second inductor (Lc2) is connected to the first end of the bypass capacitor (Cb), a second end of the bypass capacitor (Cb) is connected to the second output terminal (5b), the first reactor (Lr1) and the first inductor (Lc1) are magnetically coupled to each other, and the second reactor (Lr2) and the second inductor (Lc2) are magnetically coupled to each other, and the control circuit (9) performs switching control over the first switching element (Sw1) and the second switching element (Sw2), using an interleaving method.

In the above aspect, the power supply circuit may further include a first bypass inductor (Le1) and a second bypass inductor (Le2). The first bypass inductor (Le1) may be disposed between the second end of the first inductor (Lc1) and the first end of the bypass capacitor (Cb), and the second bypass inductor (Le2) may be disposed between the second end of the second inductor (Lc2) and the first end of the bypass capacitor (Cb).

A power supply circuit according to one aspect of the present disclosure may include a first input terminal (3a); a second input terminal (3b); a first reactor (Lr1); a second reactor (Lr2); a first switching element (Sw1); a second switching element (Sw2); a third switching element (S1); a fourth switching element (S2); a first capacitor (C1); a first output terminal (5a); a second output terminal (5b); a control circuit (9); a first inductor (Lc1); a second inductor (Lc2); a first bypass capacitor (Cb1); and a second bypass capacitor (Cb2). In the power supply circuit, the first input terminal (3a) is connected to a first end of the first reactor (Lr1), a second end of the first reactor (Lr1) is connected to a first end of the third switching element (S1), and a second end of the third switching element (S1) is connected to the first output terminal (5a), the first input terminal (3a) is connected to a first end of the second reactor (Lr2), a second end of the second reactor (Lr2) is connected to a first end of the fourth switching element (S2), and a second end of the fourth switching element (S2) is connected to the first output terminal (5a), the second input terminal (3b) is connected to the second output terminal (5b), a first end of the first switching element (Sw1) is connected to a first connection point (4a) on a path linking the second end of the first reactor (Lr1) to the first end of the third switching element (S1), and a second end of the first switching element (Sw1) is connected to the second output terminal (5b), a first end of the second switching element (Sw2) is connected to a second connection point (4c) on a path linking the second end of the second reactor (Lr2) to the first end of the fourth switching element (S2), and a second end of the second switching element (Sw2) is connected to the second output terminal (5b), a first end of the first capacitor (C1) is connected to the first output terminal (5a), and a second end of the first capacitor (C1) is connected to the second output terminal (5b), a first end of the first inductor (Lc1) is connected to a path linking the first input terminal (3a) to the first connection point (4a), a second end of the first inductor (Lc1) is connected to a first end of the first bypass capacitor (Cb1), and a second end of the first bypass capacitor (Cb1) is connected to the second output terminal (5b), a first end of the second inductor (Lc2) is connected to a path linking the first input terminal (3a) to the second connection point (4c), a second end of the second inductor (Lc2) is connected to a first end of the second bypass capacitor (Cb2), and a second end of the second bypass capacitor (Cb2) is connected to the second output terminal (5b), the first reactor (Lr1) and the first inductor (Lc1) are magnetically coupled to each other, and the second reactor (Lr2) and the second inductor (Lc2) are magnetically coupled to each other, and the control circuit (9) performs switching control over the first switching element (Sw1) and the second switching element (Sw2), using an interleaving method.

In the above aspect, the power supply circuit may further include a first bypass inductor (Le1) and a second bypass inductor (Le2). The first bypass inductor (Le1) may be disposed between the second end of the first inductor (Lc1) and the first end of the first bypass capacitor (CH), and the second bypass inductor (Le2) may be disposed between the second end of the second inductor (Lc2) and the first end of the second bypass capacitor (Cb2).

In each of the aspects of the present disclosure described above, the first end of the first inductor (Lc1) may be connected to the first input terminal (3a), and the first end of the second inductor (Lc2) may be connected to the first input terminal (3a).

Alternatively, the first end of the first inductor (Lc1) may be connected to the first connection point (4a), and the first end of the second inductor (Lc2) may be connected to the second connection point (4c).

In each of the aspects of the present disclosure described above, the power supply circuit may further include a first current sensor (91) and a second current sensor (92). The first current sensor (91) may detect a current value for a current leaving the first output terminal (5a) side and flowing through the first reactor Lr1 into the first input terminal (3a), and the second current sensor (92) may detect a current value for a current leaving the first output terminal (5a) side and flowing through the second reactor Lr2 into the first input terminal (3a). The control circuit (9) may adjust a switching frequency (fsw) and a duty ratio of each of the first switching element (Sw1) and the second switching element (Sw2) in such a way as to minimize each of predetermined frequency components included respectively in a first current value detected by the first current sensor and a second current value detected by the second current sensor.

In the above aspect, a first end of the first current sensor (91) may be connected to the first input terminal (3a), while a second end of the first current sensor (91) may be connected to the first end of the first reactor (Lr1). A first end of the second current sensor (92) may be connected to the first input terminal (3a), while a second end of the second current sensor (92) may be connected to the first end of the second reactor (Lr2). The first current sensor (91) and the second current sensor (92) may each detect a current value for a current flowing from the first output terminal (5a) side into the first input terminal (3a).

In the above aspect, the power supply circuit may further include a first bypass inductor (Le1) and a second bypass inductor (Le2). The first bypass inductor (Le1) may be disposed between the path linking the first input terminal (3a) to the first connection point (4a) and the first end of the first inductor (Lc1), and the second bypass inductor (Le2) may be disposed between the second end of the second inductor (Lc2) and a first end of the bypass capacitor (Cb23).

In the above aspect, the power supply circuit may further include a first bypass inductor (Le1) and a second bypass inductor (Le2). The first bypass inductor (Le1) may be disposed between the path linking the first input terminal (3a) to the first connection point (4a) and the first end of the first inductor (Lc1), and the second bypass inductor (Le2) may be disposed between the path linking the first input terminal (3a) to the first connection point (4a) and the first end of the second inductor (Lc2).

Each of embodiments described below is a specific example of the present disclosure. Numerical values, shapes, constituent elements, and the like are described in the following embodiments as examples, and are not intended for limiting the present disclosure. Among constituent elements included in the following embodiments, constituent elements not described in independent claims expressing the most superior concepts of the present disclosure will be described as optional constituent elements. Respective contents of all the embodiments may be combined with each other.

First Embodiment

Figure 1:
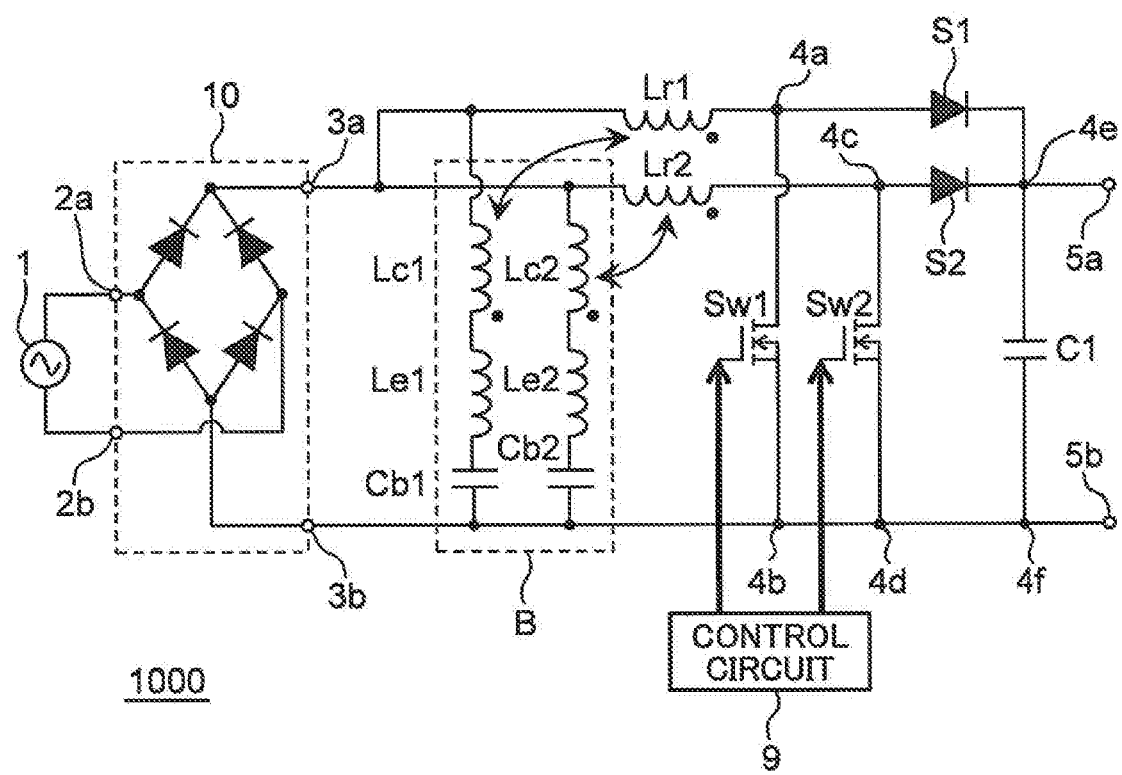
FIG. 1 is a circuit diagram showing a schematic configuration of a power supply circuit according to a first embodiment.

A first embodiment of the present disclosure will hereinafter be described. The same constituent elements as described above will be denoted by the same reference signs, and redundant description will be omitted as necessary. FIG. 1 is a circuit diagram showing a schematic configuration of a power factor improving circuit 1000 according to the first embodiment.

As shown in FIG. 1, the power factor improving circuit 1000 (an example of the power supply circuit) includes a first input terminal 3a, a second input terminal 3b, a first reactor Lr1, a second reactor Lr2, a first switching element Sw1, a second switching element Sw2, a third switching element S1, a fourth switching element S2, a first capacitor C1, a first output terminal 5a, a second output terminal 5b, a control circuit 9, and a bypass circuit B. The bypass circuit B has a first inductor Lc1, a first bypass inductor Le1, a first bypass capacitor Cb1, a second inductor Lc2, a second bypass inductor Le2, and a second bypass capacitor Cb2.

According to the power factor improving circuit 1000, the first input terminal 3a is connected to a first end of the first reactor Lr1. A second end of the first reactor Lr1 is connected to a first end of the third switching element S1. A second end of the third switching element S1 is connected to the first output terminal 5a.

The first input terminal 3a is connected to a first end of the second reactor Lr2. A second end of the second reactor Lr2 is connected to a first end of the fourth switching element S2. A second end of the fourth switching element S2 is connected to a connection point 4e on a path linking the second end of the third switching element S1 to the first output terminal 5a. As a result, the second end of the fourth switching element S2 is connected to the first output terminal 5a.

The third switching element S1 and the fourth switching element S2 are each configured by, for example, a diode. The configuration of the third switching element S1 and of the fourth switching element S2 is, however, not limited to this. The third switching element S1 and the fourth switching element S2 may be each configured by a generally known switching element, such as a transistor (e.g., MOSFET or IGBT).

According to the power factor improving circuit 1000, the second input terminal 3b is connected to the second output terminal 5b.

A first end of the first switching element Sw1 is connected to a connection point 4a (an example of a first connection point) on a path linking the second end of the first reactor Lr1 to the first end of the third switching element S1. A second end of the first switching element Sw1 is connected to a connection point 4b on a path linking the second input terminal 3b to the second output terminal 5b. As a result, the second end of the first switching element Sw1 is connected to the second output terminal 5b.

A first end of the second switching element Sw2 is connected to a connection point 4c (an example of a second connection point) on a path linking the second end of the second reactor Lr2 to the first end of the fourth switching element S2. A second end of the second switching element Sw2 is connected to a connection point 4d on the path linking the second input terminal 3b to the second output terminal 5b. As a result, the second end of the second switching element Sw2 is connected to the second output terminal 5b.

The first switching element Sw1 and the second switching element Sw2 are each configured by, for example, a generally known switching element, such as a transistor (e.g., MOSFET or IGBT).

A first end of the first capacitor C1 is connected to the connection point 4e, while a second end of the first capacitor C1 is connected to a connection point 4f on the path linking the second input terminal 3b to the second output terminal 5b. As a result, the first end of the first capacitor C1 is connected to the first output terminal 5a, while the second end of the first capacitor C1 is connected to the second output terminal 5b.

A first end of the first inductor Lc1 is connected to a path linking the first input terminal 3a to the connection point 4a.

According to the first embodiment, the first end of the first inductor Lc1 is connected to the first input terminal 3a.

A second end of the first inductor Lc1 is connected to a first end of the first bypass inductor Le1. A second end of the first bypass inductor Le1 is connected to a first end of the first bypass capacitor Cb1. In other words, the first bypass inductor Le1 is disposed between the second end of the first inductor Lc1 and the first end of the first bypass capacitor Cb1. Hence the second end of the first inductor Lc1 is connected to the first end of the first bypass capacitor Cb1 via the first bypass inductor Le1.

A first end of the second inductor Lc2 is connected to a path linking the first input terminal 3a to a connection point 4c. According to the first embodiment, the first end of the second inductor Lc2 is connected to the first input terminal 3a.

A second end of the second inductor Lc2 is connected to a first end of the second bypass inductor Le2. A second end of the second bypass inductor Le2 is connected to a first end of the second bypass capacitor Cb2. In other words, the second bypass inductor Le2 is disposed between the second end of the second inductor Lc2 and the first end of the second bypass capacitor Cb2. Hence the second end of the second inductor Lc2 is connected to the first end of the second bypass capacitor Cb2 via the second bypass inductor Le2.

The first reactor Lr1 and the first inductor Lc1 are magnetically coupled in a magnetic coupling direction indicated by points • in FIG. 1. In other words, the first reactor Lr1 and the first inductor Lc1 are magnetically coupled such that the second end of the first reactor Lr1 and the second end of the first inductor Lc1 have the same polarity. The second reactor Lr2 and the second inductor Lc2 are magnetically coupled in a magnetic coupling direction indicated by points • in FIG. 1. In other words, the second reactor Lr2 and the second inductor Lc2 are magnetically coupled such that the second end of the second reactor Lr2 and the second end of the second inductor Lc2 have the same polarity.

The control circuit 9 performs switching control over the first switching element Sw1 and the second switching element Sw2, using the interleaving method. As a result, the first switching element Sw1, the second switching element Sw2, the third switching element S1, and the fourth switching element S2 carry out interleaving operations.

According to the configuration of the first embodiment, the first switching element Sw1 and the second switching element Sw2 are subjected to switching control by the control circuit 9 using the interleaving method. As a result, out of frequency components included in triangular-wave-shaped ripples generated by switching actions of the first switching element Sw1 and the second switching element Sw2, frequency components equal to odd multiples of the switching frequency fsw can be canceled out. Hence propagation of a normal mode noise with frequency components equal to odd multiples of the switching frequency fsw to the AC power supply 1 or the like via the first input terminal 3a and the second input terminal 3b can be suppressed.

Because the first reactor Lr1 and the first inductor Lc1 are magnetically coupled to each other, a current flowing through the first reactor Lr1 excites a voltage across both terminals of the first bypass capacitor Cb1, thus causing the voltage to oscillate. As a result, the first bypass capacitor Cb1 supplies a predetermined frequency component included in the current flowing through the first reactor Lr1. For example, the first bypass capacitor Cb1 supplies a frequency component two times the switching frequency fsw. As a result, a ripple component with a frequency two times the switching frequency fsw, the ripple component being included in a current flowing through at least one of the first reactor Lr1, the first switching element Sw1, and the third switching element S1, is canceled out.

The second reactor Lr2 and the second inductor Lc2 are also magnetically coupled to each other. In the same manner as described above, therefore, a ripple component with a frequency two times the switching frequency fsw, the ripple component being included in a current flowing through at least one of the second reactor Lr2, the second switching element Sw2, and the fourth switching element S2, is canceled out.

In this manner, according to the configuration of the first embodiment, not only the ripple components with frequencies equal to odd multiples of the switching frequency fsw but also, for example, a ripple component with a frequency two times the switching frequency fsw, both ripple components flowing out via the first input terminal 3a and the second input terminal 3b as a normal mode noise, can be reduced. Thus, compared with the power factor improving circuit 9000 (FIG. 14) that performs switching control using the conventional interleaving method, normal mode noises can be further reduced.

The frequency of a ripple component to be canceled out can be adjusted properly depending on constants of electrical elements included in the bypass circuit B. For example, a case is assumed where a triangular-wave-shaped ripple component with a frequency 2fsw, which is two times the switching frequency fsw, is canceled out. In this case, a current component flowing through the first bypass capacitor Cb1, the current component having the frequency 2fsw, needs to match a current component flowing through the first reactor Lr1, the current component having the frequency 2fsw. Similarly, a current component flowing through the second bypass capacitor Cb2, the current component having the frequency 2fsw, needs to match a current component flowing through the second reactor Lr2, the current component having the frequency 2fsw. Specifically, the following formula (1) needs to be satisfied.

[Mathematical Formula 2]

$$2f_{sw} = \frac{1}{2\pi\sqrt{C_b(L_c + L_e - k\sqrt{L_r L_c})}} \quad (1)$$

In the formula (1), the left side expresses the frequency of the ripple component to be canceled out. In this specific example, the frequency of the ripple component to be canceled out is the frequency 2fsw that is two times the switching frequency fsw. Cb denotes the capacitance of the first bypass capacitor Cb1 and of the second bypass capacitor Cb2. Lr denotes the inductance of the first reactor Lr1 and of the second reactor Lr2. Lc denotes the inductance of the first inductor Lc1 and of the second inductor Lc2. Le denotes the inductance of the first bypass inductor Le1 and of the second bypass inductor Le2. Also, k denotes a coupling factor for the magnetic coupling between the first reactor Lr1 and the first inductor Lc1 and for the magnetic coupling between the second reactor Lr2 and the second inductor Lc2.

Thus, when the bypass circuit B is configured using electrical elements that satisfy the formula (1), the power factor improving circuit 1000 (which will hereinafter be referred to as "the power factor improving circuit 1000 that satisfies the formula (1)") can reduce ripple components with frequencies equal to odd multiples of the switching frequency fsw and a ripple component with a frequency two times the switching frequency fsw.

Figure 2:
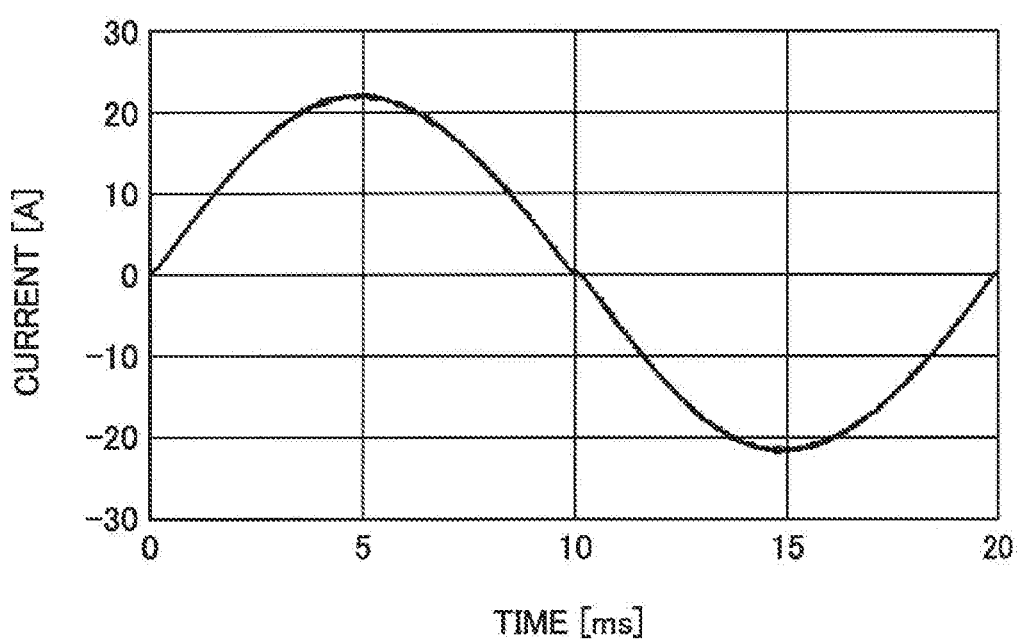
FIG. 2 is a graph showing a calculation result obtained by a circuit simulation of a power current in a power factor improving circuit that satisfies a formula (1).

FIG. 2 shows a calculation result obtained by a circuit simulation of a power current in the power factor improving circuit 1000 that satisfies the formula (1). A segment of a power current waveform shown in FIG. 2, the segment in a period from time 5 ms to time 5.1 ms, is extracted and shown in an enlarged form in FIG. 3.

In this circuit simulation, similarly to the circuit simulation of the power factor improving circuit 9000 (FIG. 14) in the comparative example described above, the inductance Lr of the first reactor Lr1 and of the second reactor Lr2 is determined to be 200 uH, and the switching frequency fsw is determined to be 100 kHz. The frequency and the effective value of an AC voltage supplied from the AC power supply 1 are determined to be 50 Hz and 200 V, respectively. The DC voltage that develops between the first output terminal 5*a* and the second output terminal 5*b* is determined to be 400 V.

To satisfy the formula (1), the capacitance Cb of the first bypass capacitor Cb1 and of the second bypass capacitor Cb2 is determined to be 200 nF. The inductance Lc of the first inductor Lc1 and of the second inductor Lc2 is determined to be 2 µH. The inductance Le of the first bypass inductor Le1 and of the second bypass inductor Le2 is determined to be 20 µH. The coupling factor k for the magnetic coupling between the first reactor Lr1 and the first inductor Lc1 and for the magnetic coupling between the second reactor Lr2 and the second inductor Lc2 is determined to be 0.95.

Figure 3:
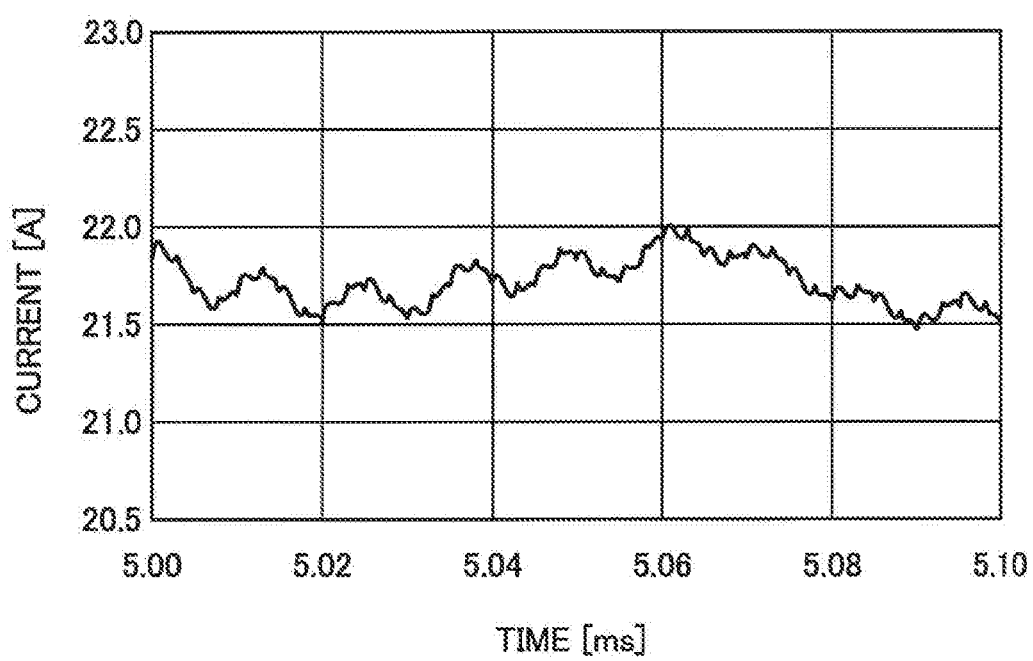
FIG. 3 is a graph showing an enlarged view of a segment of a power current waveform shown in FIG. 2, the segment being in a specific period.

The power factor improving circuit 1000 that satisfies the formula (1) can reduce ripple components with frequencies equal to one time and two times the switching frequency fsw and to odd multiples of the switching frequency fsw, i.e., three times or more the switching frequency fsw. In other words, the power factor improving circuit 1000 can reduce a ripple component with a frequency two times the switching frequency fsw, the ripple component being hardly reduced by an X capacitor because of its small capacitance, more effectively than the above power factor improving circuit 9000 (FIG. 14) in the comparative example. As a result, as shown in FIG. 2, the power current waveform generated by the power factor improving circuit 1000 has less noise components superimposed on the waveform than the power current waveform shown in FIG. 15 that is generated by the power factor improving circuit 9000 (FIG. 14). In addition, as shown in FIG. 3, as a result of reduction in the ripple component with the frequency two times the switching frequency fsw, the power current waveform generated by the power factor improving circuit 1000 has an amplitude smaller than that of the power current waveform shown in FIG. 15 that is generated by the power factor improving circuit 9000 (FIG. 14).

According to the configuration of the first embodiment, circuit symmetry is maintained. This allows electrical elements and wiring lines included in the power factor improving circuit 1000 to be provided as common elements, thus allowing reduction in manhour in design work. Further, the configuration of the first embodiment can be achieved merely by adding the bypass circuit B made up of small electrical elements to the power factor improving circuit 9000 (FIG. 14) that uses the conventional interleaving method, without adding electrical elements to a power current supply path linking the first input terminal 3*a* to the first output terminal 5*a*.

According to the configuration of the first embodiment, even if the coupling factor for the magnetic coupling between the first reactor Lr1 and the first inductor Lc1 is close to 1, a coupling factor for magnetic coupling between the first reactor Lr1 and a combined inductor created by combining the first inductor Lc1 with the first bypass inductor Le1 is considered to be small from the viewpoint of equivalency between both coupling factors. For this reason, a desired coupling factor can be obtained easily by adjusting the inductance of the first bypass inductor Le1, without changing the shape of a core used for the magnetic coupling between the first reactor Lr1 and the first inductor Lc1. Likewise, a desired coupling factor can be obtained easily by adjusting the inductance of the second bypass inductor Le2, without changing the shape of a core used for the magnetic coupling between the second reactor Lr2 and the second inductor Lc2.

Using a large core having branch magnetic paths, such as an EI core and an EE core, to obtain a desired coupling factor, therefore, can be avoided. Hence the power factor improving circuit can be miniaturized.

The configuration of the first embodiment is more advantageous in the following respects than a configuration in which the first end of the first inductor Lc1 is connected to the connection point 4*a* and the first end of the second inductor Lc2 is connected to the connection point 4*c* (this configuration will hereinafter be referred to as "first comparative configuration"). The first comparative configuration is equivalent to a configuration of a first modification of the first embodiment (FIG. 4), which will be described later on.

According to the configuration of the first embodiment, the first end of the first inductor Lc1 is connected to the first input terminal 3*a*. According to the first comparative configuration, in contrast, the first end of the first inductor Lc1 is connected to the connection point 4*a*, which is closer to the first output terminal 5*a* than the first reactor Lr1 is.

Because of this layout, a rate of change of currents flowing from the first reactor Lr1 to the first switching element Sw1 and the third switching element S1 in the first comparative configuration is larger than that in the configuration of the first embodiment. The rate of change becomes larger as the first inductor Lc1 becomes smaller. In the first comparative configuration, therefore, the first inductor Lc1 excessively small in size raises a concern that the duty ratio of the first switching element Sw1 may be out of control. In addition, in the first comparative configuration, reducing the size of the first inductor Lc1 increases a current flowing through the first inductor Lc1 to make the current larger than a current flowing through the first inductor Lc1 in the configuration of the first embodiment.

In other words, in the configuration of the first embodiment, an inductor with a current rating smaller than that of an inductor used in the first comparative configuration, can be used as the first inductor Lc1. The configuration of the first embodiment, therefore, is more advantageous than the first comparative configuration from the viewpoint of miniaturization of the first inductor Lc1. Likewise, the configuration of the first embodiment is more advantageous than the first comparative configuration from the viewpoint of miniaturization of the second inductor Lc2.

First Modification of First Embodiment

Figure 4:
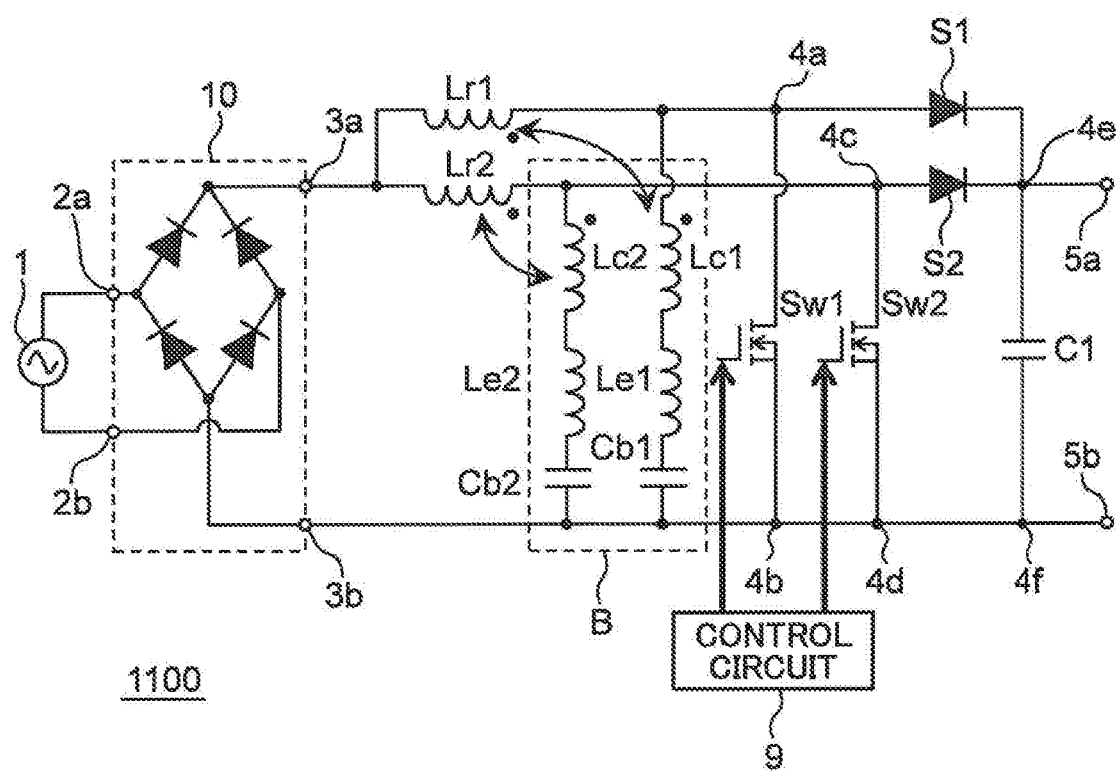
FIG. 4 is a circuit diagram showing a schematic configuration of a power factor improving circuit in a first modification of the first embodiment.

A first modification of the first embodiment will hereinafter be described. Description overlapping the above description will be omitted as necessary. FIG. 4 is a circuit diagram showing a schematic configuration of a power factor improving circuit 1100 in the first modification of the first embodiment. As shown in FIG. 4, the power factor improving circuit 1100 is different from the power factor improving circuit 1000 (FIG. 1) in that the first end of the first inductor Lc1 is connected to the connection point 4a. In addition, the first end of the second inductor Lc2 is connected to the connection point 4c.

This configuration (configuration of the first modification of the first embodiment) is more advantageous in the following respects than the configuration of the first embodiment (FIG. 1).

In this configuration, the first end of the first inductor Lc1 is connected to the connection point 4a, which is closer to the first output terminal 5a than the first reactor Lr1 is. The connection point 4a is connected to the first end of the first switching element Sw1. In contrast, in the configuration of the first embodiment (FIG. 1), the first end of the first inductor Lc1 is connected to the first input terminal 3a without interposing the first reactor Lr1 therebetween.

Because of this layout, in the configuration of the first embodiment (FIG. 1), a current flowing into the first reactor Lr1 includes a ripple component caused by switching of the first switching element Sw1. In contrast, in this configuration, part of the ripple component caused by switching of the first switching element Sw1 is canceled out in a path closer to the first output terminal 5a than the first reactor Lr1 is. This means that in this configuration, triangular-wave-shaped ripples included in the current flowing into the first reactor Lr1 are reduced as compared to the configuration of the first embodiment.

In this configuration, therefore, core loss resulting from hysteresis characteristics of a magnetic core used as the first reactor Lr1 is alleviated as compared to the configuration of the first embodiment. Likewise, core loss resulting from hysteresis characteristics of a magnetic core used as the second reactor Lr2 is alleviated as compared to the configuration of the first embodiment. In these respects, this configuration is more advantageous than the configuration of the first embodiment.

Second Modification of First Embodiment

Figure 5:
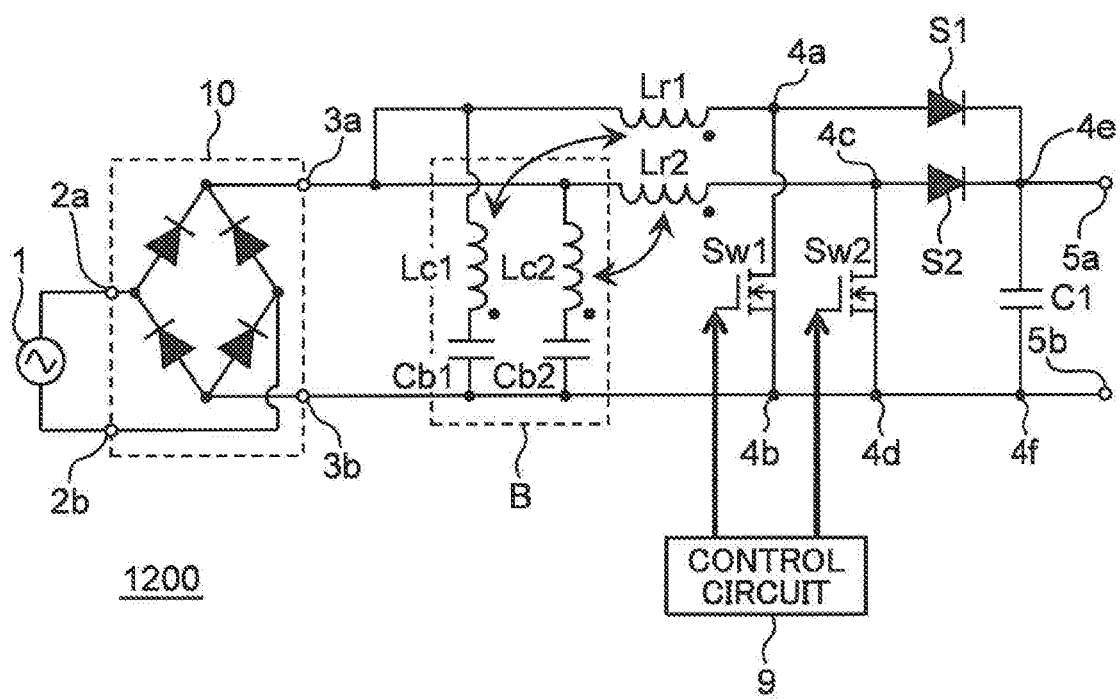
FIG. 5 is a circuit diagram showing a schematic configuration of a power factor improving circuit in a second modification of the first embodiment.

A second modification of the first embodiment will hereinafter be described. Description overlapping the above description will be omitted as necessary. FIG. 5 is a circuit diagram showing a schematic configuration of a power factor improving circuit 1200 in the second modification of the first embodiment.

As shown in FIG. 5, the power factor improving circuit 1200 is different from the power factor improving circuit 1000 (FIG. 1) in that the power factor improving circuit 1200 does not include the first bypass inductor Le1 and the second bypass inductor Le2.

This configuration, similarly to the configuration of the first embodiment, reduces ripple components with frequencies equal to odd multiples of the switching frequency fsw and a ripple component with a frequency two times the switching frequency fsw, both ripple components flowing out via the first input terminal 3a and the second input terminal 3b as a normal mode noise.

The power factor improving circuit 1100 (FIG. 4) in the first modification of the first embodiment may also be configured so as not to include the first bypass inductor Le1 and the second bypass inductor Le2, similarly to the power factor improving circuit 1200.

Third Modification of First Embodiment

Figure 6:
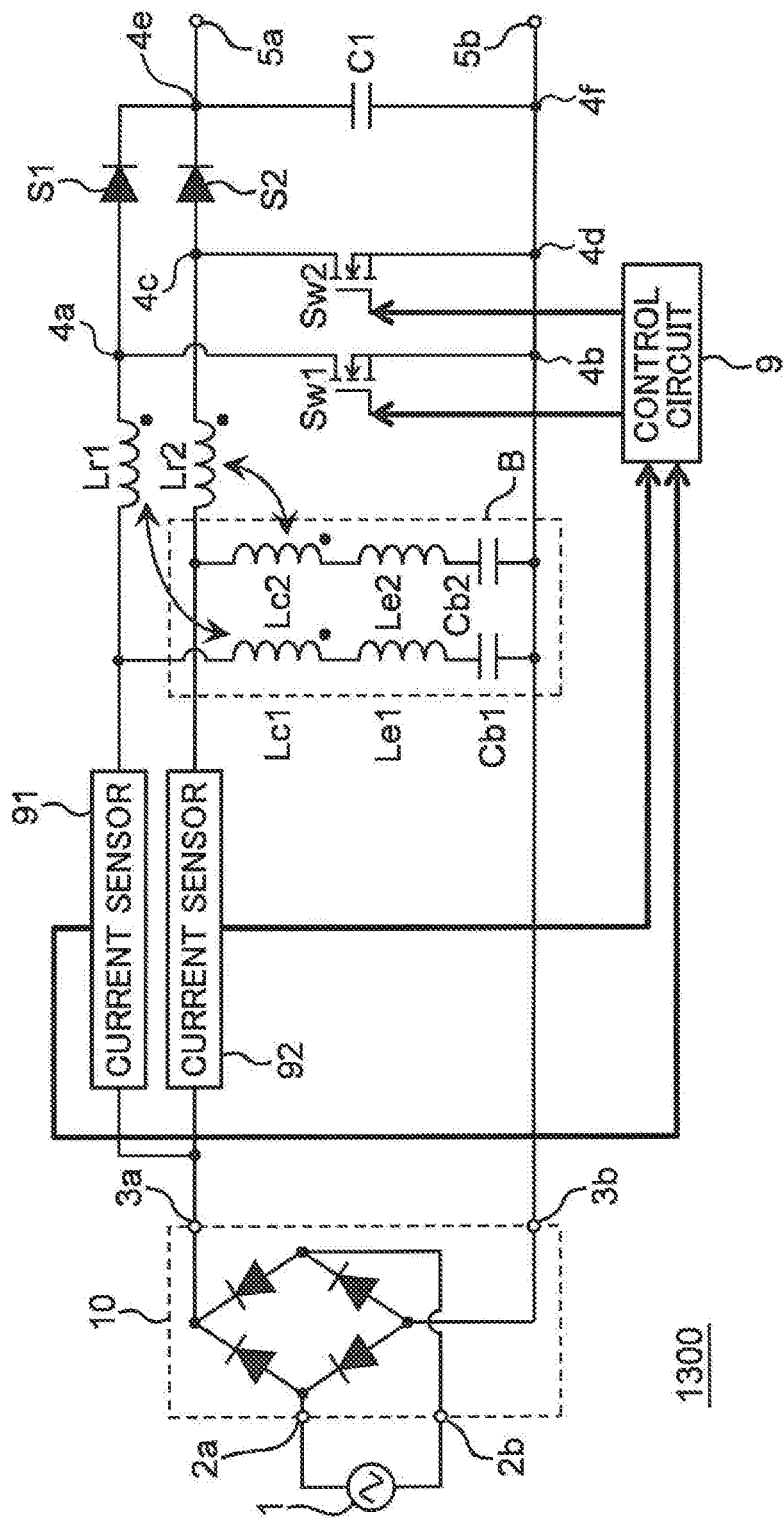
FIG. 6 is a circuit diagram showing a schematic configuration of a power factor improving circuit in a third modification of the first embodiment.

A third modification of the first embodiment will hereinafter be described. Description overlapping the above description will be omitted as necessary. FIG. 6 is a circuit diagram showing a schematic configuration of a power factor improving circuit 1300 in the third modification of the first embodiment.

As shown in FIG. 6, the power factor improving circuit 1300 is different from the power factor improving circuit 1000 (FIG. 1) in that the power factor improving circuit 1300 further includes a first current sensor 91 and a second current sensor 92.

A first end of the first current sensor 91 is connected to the first input terminal 3a, while a second end of the first current sensor 91 is connected to the first end of the first reactor Lr1. As a result, the first current sensor 91 detects a current value for a current leaving the first output terminal 5a side and flowing through the first reactor Lr1 into the first input terminal 3a, and outputs the detected current value (which will hereinafter be referred to as "first current value") to the control circuit 9.

A first end of the second current sensor 92 is connected to the first input terminal 3a, while a second end of the second current sensor 92 is connected to the first end of the second reactor Lr2. As a result, the second current sensor 92 detects a current value for a current leaving the first output terminal 5a side and flowing through the second reactor Lr2 into the first input terminal 3a, and outputs the detected current value (which will hereinafter be referred to as "second current value") to the control circuit 9.

The control circuit 9 adjusts the switching frequency fsw and the duty ratio of each of the first switching element Sw1 and the second switching element Sw2 in such a way as to minimize each of predetermined frequency components included respectively in the first current value detected by the first current sensor 91 and the second current value detected by the second current sensor 92. The switching frequency fsw and the duty ratio may be adjusted properly by a known method.

A predetermined frequency may be determined to be a frequency expressed as the product of the switching frequency fsw and the number of switching elements subjected to switching control by the control circuit 9 using the interleaving method. For example, in this modification, the control circuit 9 performs switching control over two switching elements, i.e., the first switching element Sw1 and the second switching element Sw2, using the interleaving method. The predetermined frequency is thus determined to be the frequency 2fsw, which is two times the switching frequency fsw. In this case, the control circuit 9 adjusts the switching frequency fsw and the duty ratio of each of the first switching element Sw1 and the second switching element Sw2 in such a way as to minimize each of frequency components included respectively in the first current value detected by the first current sensor 91 and the second current value detected by the second current sensor 92, the frequency components each being two times the switching frequency fsw.

According to this configuration, the first current sensor 91 and the second current sensor 92 detect respective current values for currents flowing from the first output terminal 5a side into the first input terminal 3a. To minimize each of predetermined frequency components included respectively in the detected current values, the control circuit 9 adjusts the switching frequency fsw and the duty ratio of each of the first switching element Sw1 and the second switching element Sw2.

Therefore, even if constants of electrical elements constituting the power factor improving circuit vary to provide a circuit configuration in which noise current flowing through the first input terminal 3a to the AC power supply 1 side cannot be reduced sufficiently, the above adjustment by the control circuit 9 can minimize the noise current.

The power factor improving circuit 1100 (FIG. 4), the power factor improving circuit 1200 (FIG. 5), and the power factor improving circuit described in the second modification of the first embodiment in which the power factor improving circuit 1100 (FIG. 511) is not provided with the first bypass inductor Le1 and the second bypass inductor Let, may each further include the first current sensor 91 and the second current sensor 92, similarly to the power factor improving circuit 1300. In each of these power factor improving circuits, the control circuit 9 may adjust the switching frequency fsw and the duty ratio of each of the first switching element Sw1 and the second switching element Sw2 in such a way as to minimize each of predetermined frequency components included respectively in the first current value and the second current value.

The first end of the first current sensor 91 may be connected to the second input terminal 3b, while the second end of the first current sensor 91 may be connected to the second end of the first bypass capacitor Cb1, and the first end of the second current sensor 92 may be connected to the second input terminal 3b, while the second end of the second current sensor 92 may be connected to the second end of the second bypass capacitor Cb2. In this case, the control circuit 9 adjusts the switching frequency fsw and the duty ratio of each of the first switching element Sw1 and the second switching element Sw2 in such a way as to maximize each of the predetermined frequency components included respectively in the first current value detected by the first current sensor 91 and the second current value detected by the second current sensor 92.

The first end of the first current sensor 91 may be connected to the connection point 4b, while the second end of the first current sensor 91 may be connected to the second end of the first switching element Sw1, and the first end of the second current sensor 92 may be connected to the connection point 4d, while the second end of the second current sensor 92 may be connected to the second end of the second switching element Sw2. In this case, the control circuit 9 adjusts the switching frequency fsw and the duty ratio of each of the first switching element Sw1 and the second switching element Sw2 such that the predetermined frequency components included respectively in the first current value detected by the first current sensor 91 and the second current value detected by the second current sensor 92 become equal with each other.

In this layout, the first current sensor 91 and the second current sensor 92 may each detect a possible current inflow from the second output terminal 5b side to the second input terminal 3b. In this case, even if the constants of the electrical elements constituting the power factor improving circuit vary to provide a circuit configuration in which noise current flowing through the second input terminal 3b to the AC power supply 1 cannot be reduced sufficiently, the above adjustment by the control circuit 9 can minimize the noise current.

The configurations of the first embodiment and the modifications thereof raise a concern that while a ripple component with a frequency two times the switching frequency fsw is reduced by the bypass circuit B, ripple components with frequencies equal to even multiples of the switching frequency fsw may not be reduced sufficiently and, consequently, propagate as a normal mode noise to cause a problem, such as malfunctioning of peripheral circuits. To eliminate this concern, in the configurations of the first embodiment and the modifications thereof, the control circuit 9 may perform so-called frequency spread control to also reduce triangular-wave-shaped ripples with frequencies equal to even multiples of the switching frequency fsw and to four times or more the switching frequency fsw.

Points of Improvement of First Embodiment and Modifications Thereof

Figure 7:
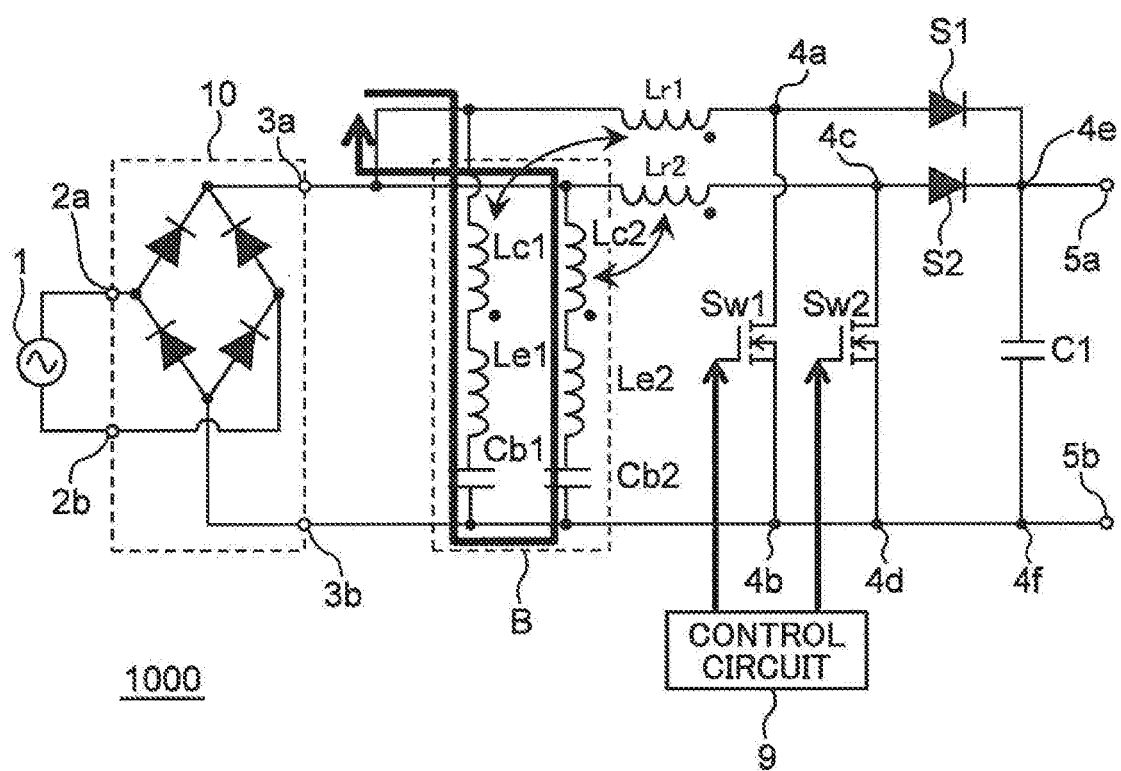
FIG. 7 is a diagram for describing a point of improvement of the power factor improving circuit according to the first embodiment.

Points of further improvement of the first embodiment and the modifications thereof will hereinafter be described. FIG. 7 is a diagram for describing a point of improvement of the power factor improving circuit 1000 according to the first embodiment. As shown in FIG. 7, in the power factor improving circuit 1000 according to the first embodiment, for example, a current path indicated by a thick line is formed.

Because of this, when respective constants of the electrical elements constituting the bypass circuit B are determined using the formula (1) and the like and, as a result, a resonance frequency of the bypass circuit B, the resonance frequency being determined depending on the constants of the electrical elements, turns out close to the switching frequency fsw, it raises a concern that a resonance current with a large current value may flow through the bypass circuit B.

It is assumed, for example, that the switching frequency fsw is 100 kHz. It is further assumed that, to reduce a noise with a frequency 2fsw (=200 kHz), which is two times the switching frequency fsw, by the bypass circuit B, respective constants of the electrical elements constituting the bypass circuit B are determined in such a way as to satisfy the formula (1).

Specifically, it is assumed that the inductance Lr of the first reactor Lr1 and of the second reactor Lr2 is determined to be 200 uH. It is also assumed that, to satisfy the formula (1), the inductance Lc of the first inductor Lc1 and of the second inductor Lc2 is determined to be 2 uH, the inductance Le of the first bypass inductor Le1 and of the second bypass inductor Le2 is determined to be 20 uH, and the capacitance Cb of the first bypass capacitor Cb1 and of the second bypass capacitor Cb2 is determined to be 200 nF. It is further assumed that the coupling factor for the magnetic coupling between the first reactor Lr1 and the first inductor Lc1 and the coupling factor for the magnetic coupling of the second reactor Lr2 and the second inductor Lc2 are each determined to be 0.95.

In this case, substituting the capacitance Cb (=200 nF), the inductance Lc (=2 μH), and the inductance Le (=20 μH), which are determined in such a way as to satisfy the formula (1), in the following formula (2), which expresses the resonance frequency freso of the bypass circuit B, gives the resonance frequency freso of the bypass circuit B being equal to 76 kHz.

[Mathematical Formula 3]

$$f_{reso} = \frac{1}{2\pi\sqrt{C_b(L_c + L_e)}} \qquad (2)$$

As in this case, when the resonance frequency freso (=76 kHz) of the bypass circuit B is close to the switching frequency fsw (=100 kHz), it raises a concern that a resonance current with a large current value (e.g., 10 A or more)

may flow through the bypass circuit B. In this case, the electrical elements constituting the bypass circuit B are required to have large current ratings, respectively, which brings a need of constituting the bypass circuit B from large electrical elements. In other words, the power factor improving circuit 1000 according to the first embodiment has a room for improvement that the bypass circuit B needs to be miniaturized. The power factor improving circuits described as the first to third modifications of the first embodiment also raise a concern that a current loop may be formed in the bypass circuit B as in the power factor improving circuit 1000, and therefore each have a room for improvement that the bypass circuit B needs to be miniaturized.

To deal with the above problems, the present inventors have examined whether respective constants of the electrical elements of the bypass circuit B can be determined in such a way as to prevent the resonance frequency freso of the bypass circuit B from being close to the switching frequency fsw, without changing a circuit configuration.

Specifically, the switching frequency fsw can be expressed by the following formula (3) obtained by transforming the formula (1).

[Mathematical Formula 4]

$$f_{sw} = \frac{1}{4\pi\sqrt{C_b(L_c + L_e - k\sqrt{L_r L_c})}} \quad (3)$$

The following formula (4) holds due to a size relationship between the denominator of the right side of the formula (2) and the denominator of the right side of the formula (3).

[Mathematical Formula 5]

$$f_{reso} = \frac{1}{2\pi\sqrt{C_b(L_c + L_e)}} < \frac{1}{2\pi\sqrt{C_b(L_c + L_e - k\sqrt{L_r L_c})}} = 2f_{sw} \quad (4)$$

From the formula (4), the present inventors have found that respective constants of the electrical elements of the bypass circuit B cannot be determined in such a way as to make the resonance frequency freso of the bypass circuit B two times or more the switching frequency fsw.

Therefore, contrary to the above, the present inventors have examined whether respective constants of the electrical elements of the bypass circuit B can be determined in such a way as to make the resonance frequency freso of the bypass circuit B equal to or less than a half of the switching frequency fsw.

Specifically, to make the resonance frequency freso of the bypass circuit B equal to or less than a half of the switching frequency fsw, the following formula (5) needs to be satisfied, the formula (5) being derived from the formula (2) and a formula obtained by multiplying both sides of the formula (3) by ½.

[Mathematical Formula 6]

$$f_{reso} = \frac{1}{2\pi\sqrt{C_b(L_c + L_e)}} < \frac{1}{8\pi\sqrt{C_b(L_c + L_e - k\sqrt{L_r L_c})}} = 0.5f_{sw} \quad (5)$$

The formula (5) can be transformed into the following formula (6), which can be transformed into the following formula (7).

[Mathematical Formula 7]

$$(L_c + L_e) > 16(L_c + L_e - k\sqrt{L_r L_c}) \quad (6)$$

[Mathematical Formula 8]

$$16k\sqrt{L_r L_c} > 15(L_c + L_e) \quad (7)$$

Because the coupling factor k represents a value slightly smaller than 1 (e.g., 0.95), 16 k on the left side of the formula (7) can be approximated at 15. Approximating 16k at 15 in the formula (7) gives the following formula (8).

[Mathematical Formula 9]

$$\sqrt{L_r L_c} > L_c + L_e \quad (8)$$

Now, the formula (8) from which the inductance Lc having influences on its both sides is removed is considered. To satisfy the formula (8) as such, it is necessary to increase the inductance Lr or reduce the inductance Le. However, the inductance Lr is the inductance of the first reactor Lr1 and of the second reactor Lr2, and the first reactor Lr1 and the second reactor Lr2 are disposed on the power current supply path linking the first input terminal 3a to the first output terminal 5a. To increase the inductance Lr, therefore, the first reactor Lr1 and the second reactor Lr2 need to be provided as large components.

An alternative approach then may be considered, by which the inductance Le is reduced to make the resonance frequency freso of the bypass circuit B equal to or less than a half of the switching frequency fsw. However, in order to reduce triangular-wave-shaped ripples with a frequency two times the switching frequency, i.e., frequency 2fsw, when the inductance Le is reduced and the constants of the electrical elements other than the first and second bypass inductors Le1 and Le2 of the bypass circuit B are determined in such a way as to satisfy the formula (1), the capacitance Cb included in the formula (1) needs to be increased. However, the capacitance Cb is the capacitance of the first bypass capacitor Cb1 and of the second bypass capacitor Cb2. To increase the capacitance Cb, therefore, the first bypass capacitor Cb1 and the second bypass capacitor Cb2 need to be provided as large components.

In short, when a ripple component with a frequency two times the switching frequency fsw is reduced by the bypass circuit B included in each of the power factor improving circuits described as the first embodiment and the modifications thereof, each power factor improving circuit needs to be increased in size.

Based on the above knowledge, the present inventors have devised configurations of a second embodiment and modifications thereof, which will be described below.

Second Embodiment

Figure 8:
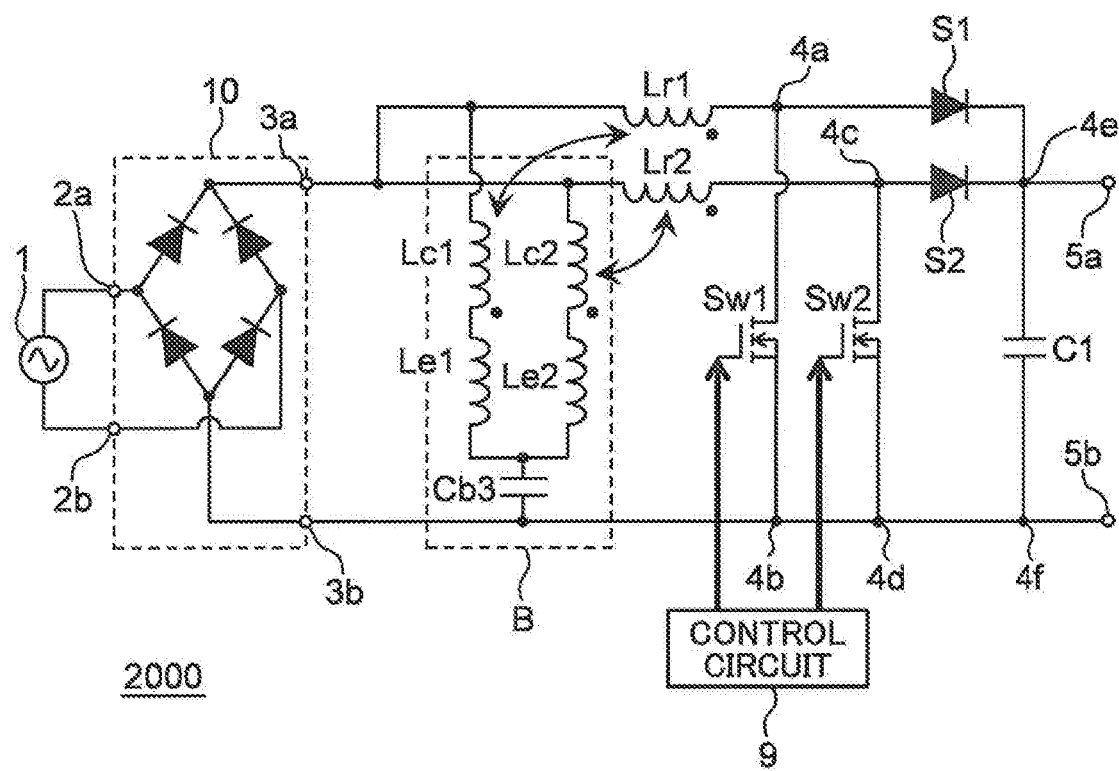
FIG. 8 is a circuit diagram showing a schematic configuration of a power factor improving circuit according to a second embodiment.

A second embodiment of the present disclosure will hereinafter be described. The same constituent elements as described above will be denoted by the same reference signs, and redundant description will be omitted as necessary. FIG. 8 is a circuit diagram showing a schematic configuration of a power factor improving circuit 2000 according to the second embodiment.

As shown in FIG. 8, the power factor improving circuit 2000 (an example of the power supply circuit) is different from the power factor improving circuit 1000 of FIG. 1 in the configuration of the bypass circuit B. The bypass circuit B of the power factor improving circuit 2000 has the first inductor Lc1, the first bypass inductor Le1, the second inductor Lc2, the second bypass inductor Le2, and a bypass capacitor Cb3.

In the power factor improving circuit 2000, the second end of the first inductor Lc1 is connected to the first end of the first bypass inductor Le1. The second end of the first bypass inductor Le1 is connected to a first end of the bypass capacitor Cb3. In other words, the first bypass inductor Le1 is disposed between the second end of the first inductor Lc1 and the first end of the bypass capacitor Cb3. Hence the second end of the first inductor Lc1 is connected to the first end of the bypass capacitor Cb3 via the first bypass inductor Le1.

The second end of the second inductor Lc2 is connected to the first end of the second bypass inductor Le2. The second end of the second bypass inductor Le2 is connected to the first end of the bypass capacitor Cb3. In other words, the second bypass inductor Le2 is disposed between the second end of the second inductor Lc2 and the first end of the bypass capacitor Cb3. Hence the second end of the second inductor Lc2 is connected to the first end of the bypass capacitor Cb3 via the second bypass inductor Le2.

The configuration of the second embodiment achieves the same effect as in the configuration of the first embodiment.

In the configuration of the second embodiment, the frequency of a ripple component to be canceled out can be adjusted properly depending on constants of electrical elements constituting the bypass circuit B. For example, a case is assumed where a ripple component with the frequency 2fsw, which is two times the switching frequency fsw, is canceled out. In this case, to cancel out the ripple component, a current flowing through the bypass capacitor Cb3, the current having the frequency 2fsw, needs to match the sum of a current component flowing through the first reactor Lr1, the current component having the frequency 2fsw, and a current component flowing through the second reactor Lr2, the current component having the frequency 2fsw. Specifically, the following formula (9) needs to be satisfied.

[Mathematical Formula 10]

$$2f_{sw} = \frac{1}{2\pi\sqrt{\frac{C_b}{2}(L_c + L_e - k\sqrt{L_r L_c})}} \quad (9)$$

In the formula (9), the left side expresses the frequency of the ripple component to be canceled out. In this specific example, the frequency of the ripple component to be canceled out is the frequency 2fsw that is two times the switching frequency fsw. Cb denotes the capacitance of the bypass capacitor Cb3. Lr denotes the inductance of the first reactor Lr1 and of the second reactor Lr2. Lc denotes the inductance of the first inductor Lc1 and of the second inductor Lc2. Le denotes the inductance of the first bypass inductor Le1 and of the second bypass inductor Le2. Also, k denotes a coupling factor for the magnetic coupling between the first reactor Lr1 and the first inductor Lc1 and for the magnetic coupling between the second reactor Lr2 and the second inductor Lc2.

Thus, when the bypass circuit B is configured using electrical elements that satisfy the formula (9), the power factor improving circuit 2000 (which will hereinafter be referred to as "the power factor improving circuit 2000 that satisfies the formula (9)") can reduce ripple components with frequencies equal to odd multiples of the switching frequency fsw and a ripple component with a frequency two times the switching frequency fsw.

Figure 9:
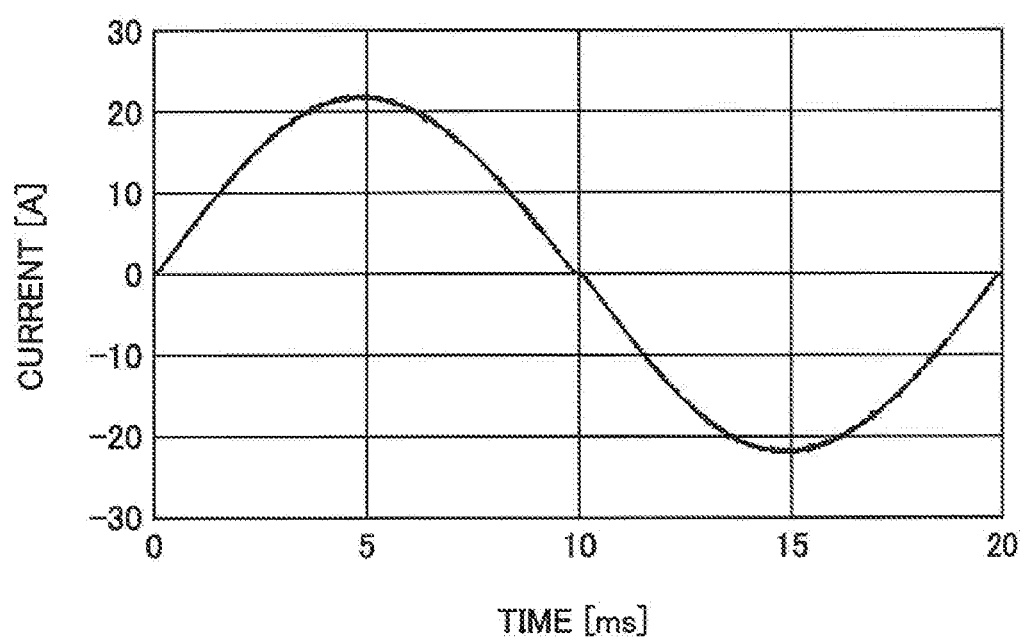
FIG. 9 is a graph showing a calculation result obtained by a circuit simulation of a power current in a power factor improving circuit that satisfies a formula (9).

FIG. 9 shows a calculation result obtained by a circuit simulation of a power current in the power factor improving circuit 2000 that satisfies the formula (9). A segment of a power current waveform shown in FIG. 9, the segment in a period from time 5 ms to time 5.1 ms, is extracted and shown in an enlarged form in FIG. 10.

In this circuit simulation, similarly to the circuit simulation of the power factor improving circuit 9000 (FIG. 14) in the comparative example described above, the inductance Lr of the first reactor Lr1 and of the second reactor Lr2 is determined to be 200 uH, and the switching frequency fsw is determined to be 100 kHz. The frequency and the effective value of an AC voltage supplied from the AC power supply 1 are determined to be 50 Hz and 200 V, respectively. The DC voltage that develops between the first output terminal 5a and the second output terminal 5b is determined to be 400 V.

To satisfy the formula (9), the capacitance Cb of the bypass capacitor Cb3 is determined to be 400 nF. The inductance Lc of the first inductor Lc1 and of the second inductor Lc2 is determined to be 2 µH. The inductance Le of the first bypass inductor Le1 and of the second bypass inductor Le2 is determined to be 20 µH. The coupling factor k for the magnetic coupling between the first reactor Lr1 and the first inductor Lc1 and for the magnetic coupling between the second reactor Lr2 and the second inductor Lc2 is determined to be 0.95.

Figure 10:
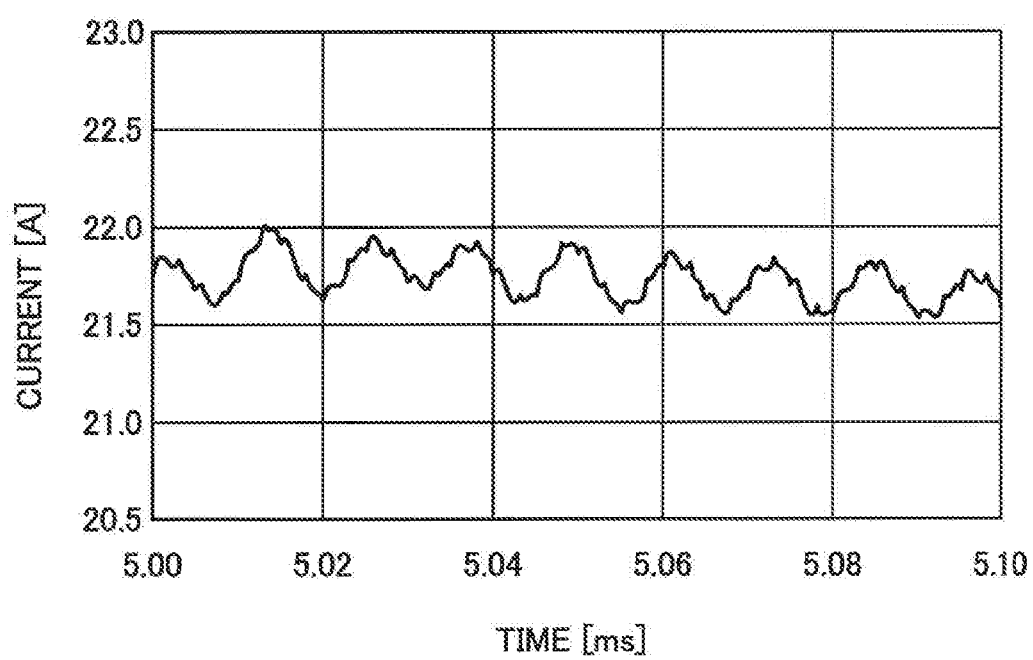
FIG. 10 is a graph showing an enlarged view of a segment of a power current waveform shown in FIG. 9, the segment being in a specific period.

The power factor improving circuit 2000 that satisfies the formula (9) can reduce ripple components with frequencies equal to one time and two times the switching frequency fsw and to odd multiples of the switching frequency fsw, i.e., three times or more the switching frequency fsw. In other words, the power factor improving circuit 2000 can reduce a ripple component with a frequency two times the switching frequency fsw, the ripple component being hardly reduced by an X capacitor because of its small capacitance, more effectively than the above power factor improving circuit 9000 (FIG. 14) in the comparative example described above. As a result, as shown in FIG. 9, the power current waveform generated by the power factor improving circuit 2000 has less noise components superimposed on the waveform than the power current waveform shown in FIG. 15 that is generated by the power factor improving circuit 9000 (FIG. 14). In addition, as shown in FIG. 10, as a result of reduction in the ripple component with the frequency two times the switching frequency fsw, the power current waveform generated by the power factor improving circuit 2000 has an amplitude smaller than that of the power current waveform shown in FIG. 15 that is generated by the power factor improving circuit 9000 (FIG. 14).

According to the configuration of the second embodiment, the first input terminal 3a is connected to the first end of the first inductor Lc1 and to the first end of the second inductor Lc2, the first end of the bypass capacitor Cb3 is connected to the second end of the first inductor Lc1 and to the second end of the second inductor Lc2, and the second end of the bypass capacitor Cb3 is connected to the second output terminal 5b.

Because of this layout, a current path through which a current leaving the first input terminal 3a flows through the first inductor Lc1, the bypass capacitor Cb3, and the second inductor Lc2 to return to the first input terminal 3a is not formed. This prevents a case where a resonance current with a large current value flows through the first inductor Lc1, the bypass capacitor Cb3, and the second inductor Lc2 that are included in the current path. As a result, the first inductor Lc1, the bypass capacitor Cb3, and the second inductor Lc2 can be provided as small-sized components with small current ratings, which allows miniaturization of the power supply circuit.

The number of the bypass capacitors included in the bypass circuit B in the configuration of the second embodiment is smaller than that in the configurations of the first embodiment and the modifications thereof, by one. For this reason, according to the configuration of the second embodiment, the bypass circuit B can be configured to be smaller and less expensive than the bypass circuit B in the configurations of the first embodiment and the modifications thereof.

First Modification of Second Embodiment

Figure 11:
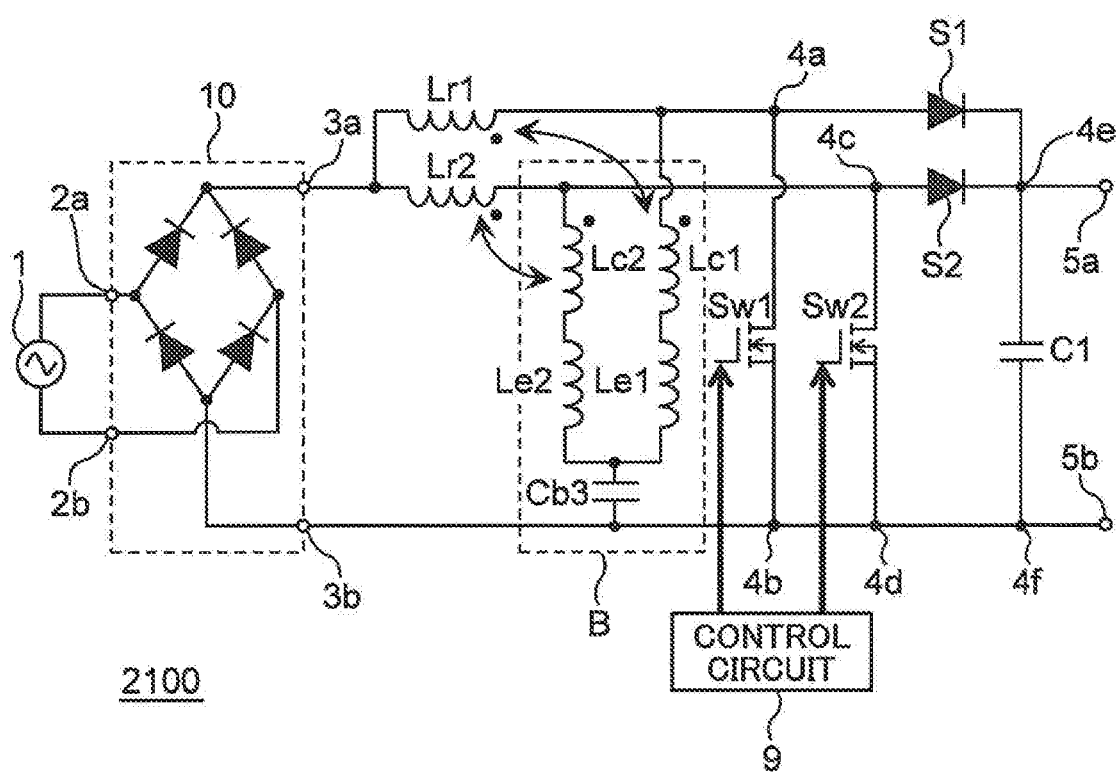
FIG. 11 is a circuit diagram showing a schematic configuration of a power factor improving circuit in a first modification of the second embodiment.

A first modification of the second embodiment will hereinafter be described. Description overlapping the above description will be omitted as necessary. FIG. 11 is a circuit diagram showing a schematic configuration of a power factor improving circuit 2100 in a first modification of the second embodiment. As shown in FIG. 11, the power factor improving circuit 2100 is different from the power factor improving circuit 2000 (FIG. 8) in that the first end of the first inductor Lc1 is connected to the connection point 4a, similarly to the power factor improving circuit 1100 (FIG. 4) in the first modification of the first embodiment. In addition, the first end of the second inductor Lc2 is connected to the connection point 4c.

This configuration achieves the same effect as achieved by the configuration of the first modification of the first embodiment.

Second Modification of Second Embodiment

Figure 12:
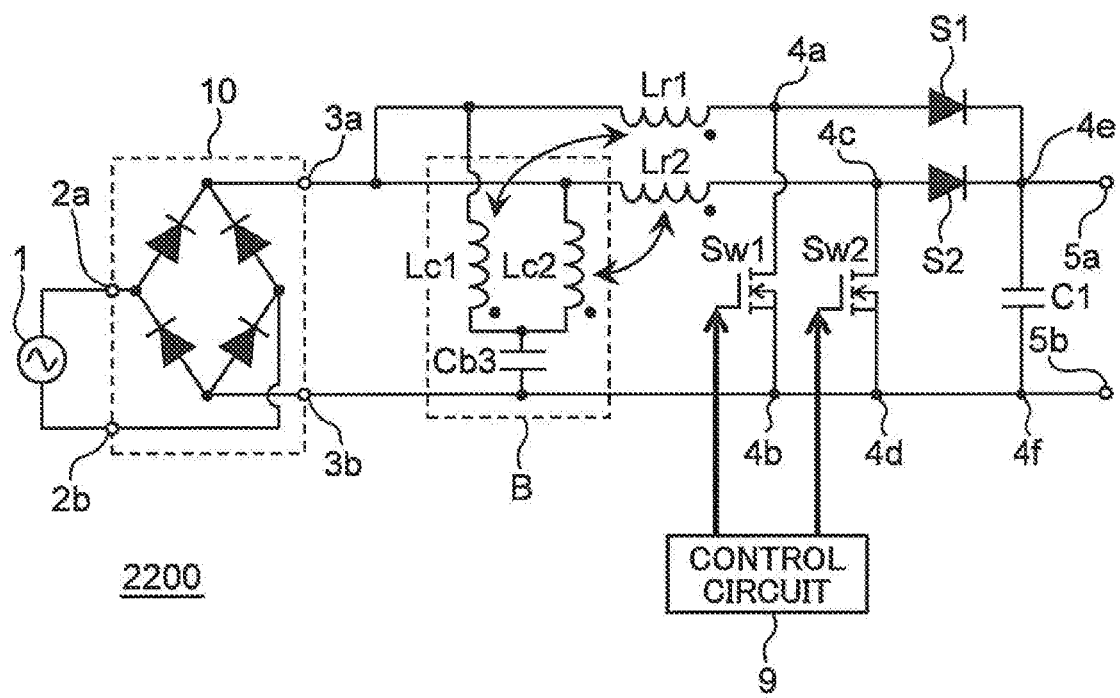
FIG. 12 is a circuit diagram showing a schematic configuration of a power factor improving circuit in a second modification of the second embodiment.

A second modification of the second embodiment will hereinafter be described. Description overlapping the above description will be omitted as necessary. FIG. 12 is a circuit diagram showing a schematic configuration of a power factor improving circuit 2200 in the second modification of the second embodiment.

As shown in FIG. 12, the power factor improving circuit 2200 is different from the power factor improving circuit 2000 (FIG. 8) in that the power factor improving circuit 2200 does not include the first bypass inductor Le1 and the second bypass inductor Le2, similarly to the power factor improving circuit 1200 (FIG. 5), i.e., the second modification of the first embodiment.

This configuration, similarly to the configuration of the second embodiment, reduces ripple components with frequencies equal to odd multiples of the switching frequency fsw and a ripple component with a predetermined frequency, both ripple components flowing out via the first input terminal 3a and the second input terminal 3b as a normal mode noise.

The power factor improving circuit 2100 (FIG. 11) in the first modification of the second embodiment may also be configured not to include the first bypass inductor Le1 and the second bypass inductor Le2, similarly to the power factor improving circuit 2200.

Third Modification of Second Embodiment

Figure 13:
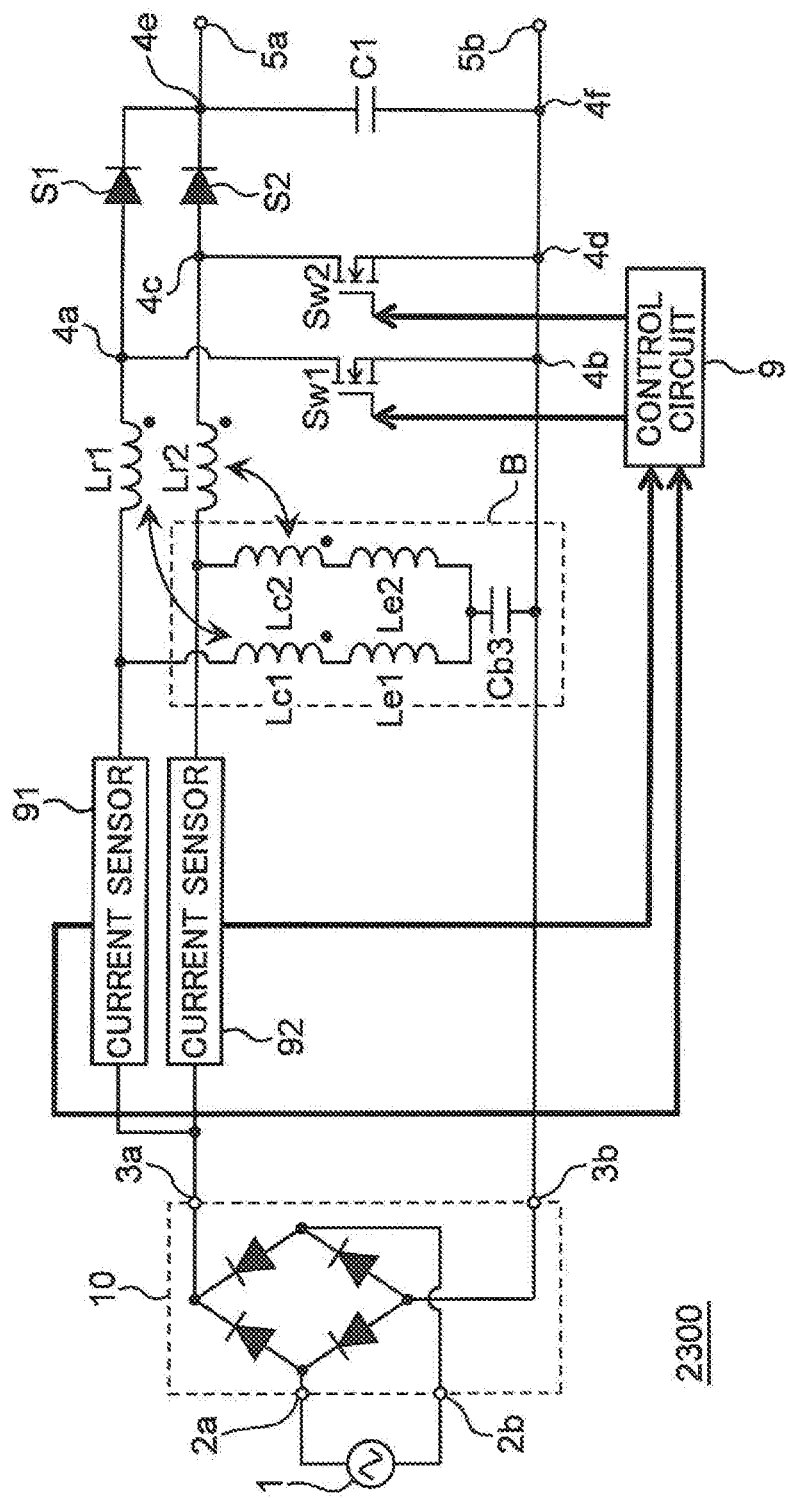
FIG. 13 is a circuit diagram showing a schematic configuration of a power factor improving circuit in a third modification of the second embodiment.

A third modification of the second embodiment will hereinafter be described. Description overlapping the above description will be omitted as necessary. FIG. 13 is a circuit diagram showing a schematic configuration of a power factor improving circuit 2300 in the third modification of the second embodiment.

As shown in FIG. 13, the power factor improving circuit 2300 is different from the power factor improving circuit 2000 (FIG. 8) in that the power factor improving circuit 2300 further includes the first current sensor 91 and the second current sensor 92, similarly to the power factor improving circuit 1300 (FIG. 6) in the third modification of the first embodiment. In the power factor improving circuit 2300, the control circuit 9 adjusts the switching frequency fsw and the duty ratio of each of the first switching element Sw1 and the second switching element Sw2 in such a way as to minimize each of predetermined frequency components included respectively in the first current value detected by the first current sensor 91 and the second current value detected by the second current sensor 92.

This configuration achieves the same effect as achieved by the configuration of the third modification of the first embodiment.

The power factor improving circuit 2100 (FIG. 11), the power factor improving circuit 2200 (FIG. 12), and the power factor improving circuit described in the second modification of the second embodiment in which the power factor improving circuit 2100 (FIG. 11) is not provided with the first bypass inductor Le1 and the second bypass inductor Let, may each further include the first current sensor 91 and the second current sensor 92, similarly to the power factor improving circuit 2300. In each of these power factor improving circuits, the control circuit 9 may adjust the switching frequency fsw and the duty ratio of each of the first switching element Sw1 and the second switching element Sw2 in such a way as to minimize each of predetermined frequency components included respectively in the first current value and the second current value.

The first end of the first current sensor 91 may be connected to the second end of the first bypass inductor Le1, while the second end of the first current sensor 91 may be connected to the first end of the bypass capacitor Cb3. The first end of the second current sensor 92 may be connected to the second end of the second bypass inductor Le2, while the second end of the second current sensor 92 may be connected to the first end of the bypass capacitor Cb3. In a configuration not including the first bypass inductor Le1 and the second bypass inductor Le2, the first end of the first current sensor 91 may be connected to the second end of the first inductor Lc1 and the first end of the second current sensor 92 may be connected to the second end of the second inductor Lc2.

In this case, the control circuit 9 adjusts the switching frequency fsw and the duty ratio of each of the first switching element Sw1 and the second switching element Sw2 in such a way as to maximize each of the predetermined frequency components included respectively in the first current value detected by the first current sensor 91 and the second current value detected by the second current sensor 92.

Alternatively, the first end of the first current sensor 91 may be connected to the connection point 4b, while the second end of the first current sensor 91 may be connected to the second end of the first switching element Sw1, and the first end of the second current sensor 92 may be connected to the connection point 4d, while the second end of the second current sensor 92 may be connected to the second end of the second switching element Sw2. In this case, the control circuit 9 adjusts the switching frequency fsw and the duty ratio of each of the first switching element Sw1 and the second switching element Sw2 such that the predetermined frequency components included respectively in the first current value detected by the first current sensor 91 and the second current value detected by the second current sensor 92 become equal with each other.

In this layout, the first current sensor 91 and the second current sensor 92 may each detect a possible current inflow from the second output terminal 5b to the second input terminal 3b. In this case, even if the constants of the electrical elements constituting the power factor improving circuit vary to provide a circuit configuration in which noise current flowing through the second input terminal 3b to the AC power supply 1 side cannot be reduced sufficiently, the above adjustment by the control circuit 9 minimizes such the noise current.

Fourth Modification of Second Embodiment

Figure 19:
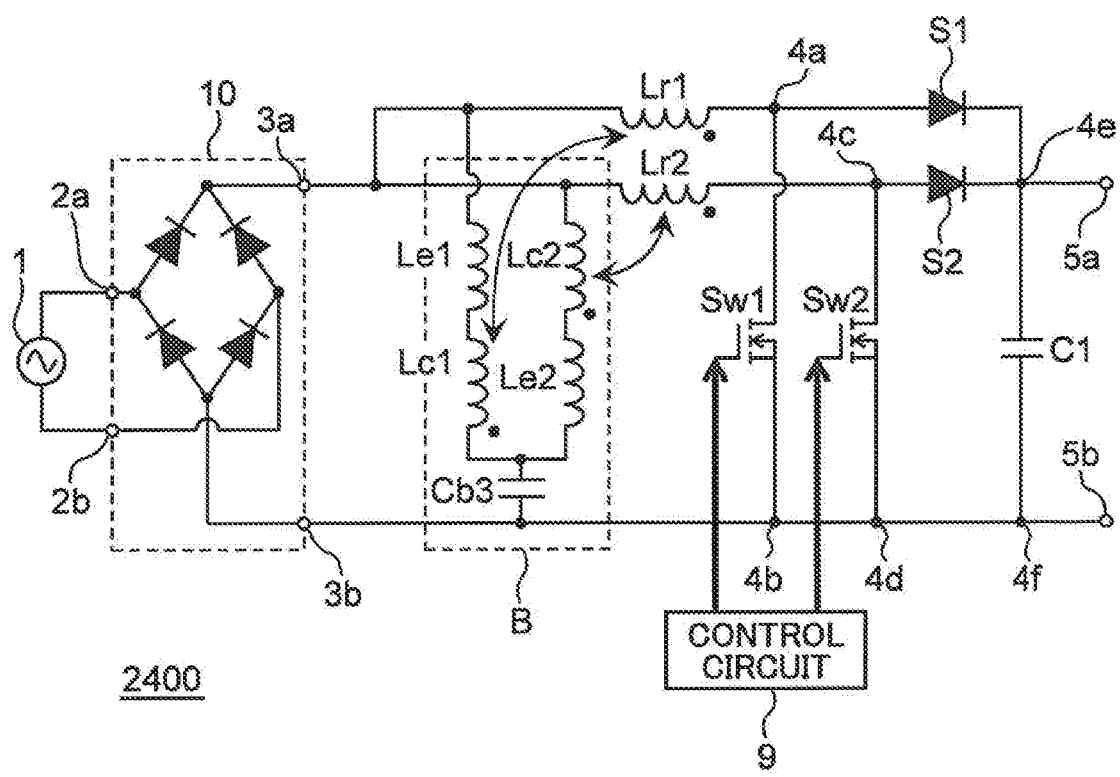
FIG. 19 is a circuit diagram showing a schematic configuration of a power factor improving circuit in a fourth modification of the second embodiment.

A fourth modification of the second embodiment will hereinafter be described. Description overlapping the above description will be omitted as necessary. FIG. 19 is a circuit diagram showing a schematic configuration of a power factor improving circuit 2400 in the fourth modification of the second embodiment.

As shown FIG. 19, the power factor improving circuit 2400 is different from the power factor improving circuit 2000 (FIG. 8) in that the first bypass inductor Le1 is disposed between a path linking the first input terminal 3a to the first connection point 4a and the first end of the first inductor Lc1.

Specifically, the first bypass inductor Le1 is disposed between the first end of the first reactor Lr1 and the first end of the first inductor Lc1, and the second end of the first inductor Lc1 is connected to the first end of the bypass capacitor Cb3.

The configuration of the power factor improving circuit 2400 achieves the same effect as achieved by the configuration of the second embodiment.

The power factor improving circuit 2100 (FIG. 11) may be modified to have the same configuration as the configuration of the power factor improving circuit 2400 in which the first bypass inductor Le1 is disposed between the path linking the first input terminal 3a to the first connection point 4a and the first end of the first inductor Lc1.

Fifth Modification of Second Embodiment

Figure 20:
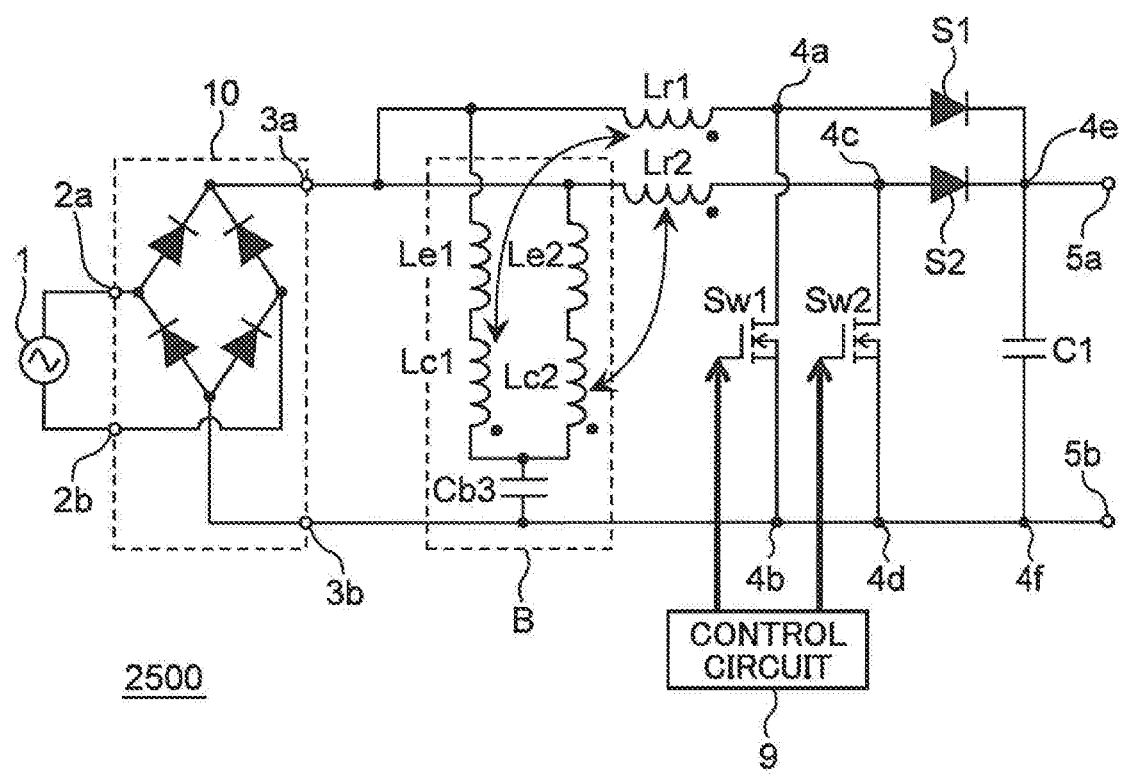
FIG. 20 is a circuit diagram showing a schematic configuration of a power factor improving circuit in a fifth modification of the second embodiment.

A fifth modification of the second embodiment will hereinafter be described. Description overlapping the above description will be omitted as necessary. FIG. 20 is a circuit diagram showing a schematic configuration of a power factor improving circuit 2500 in the fifth modification of the second embodiment.

As shown in FIG. 20, the power factor improving circuit 2500 is different from the power factor improving circuit 2000 (FIG. 8) and from the power factor improving circuit 2400 (FIG. 19) in that the first bypass inductor Le1 is disposed between the path linking the first input terminal 3a to the first connection point 4a and the first end of the first inductor Lc1 while the second bypass inductor Le2 is disposed between the path linking the first input terminal 3a to the first connection point 4a and the first end of the second inductor Lc2.

Specifically, the first bypass inductor Le1 is disposed between the first end of the first reactor Lr1 and the first end of the first inductor Lc1, and the second end of the first inductor Lc1 is connected to the first end of the bypass capacitor Cb3. Likewise, the second bypass inductor Le2 is disposed between the first end of the second reactor Lr2 and the first end of the second inductor Lc2, and the second end of the second inductor Lc2 is connected to the first end of the bypass capacitor Cb3.

The configuration of the power factor improving circuit 2500 achieves the same effect as achieved by the configuration of the second embodiment.

The power factor improving circuit 2100 (FIG. 11) may be modified to have the same configuration as the configuration of the power factor improving circuit 2500 in which the first bypass inductor Le1 is disposed between the path linking the first input terminal 3a to the first connection point 4a and the first end of the first inductor Lc1 while the second bypass inductor Le2 is disposed between the path linking the first input terminal 3a to the first connection point 4a and the first end of the second inductor Lc2.

Sixth Modification of Second Embodiment

Figure 21:
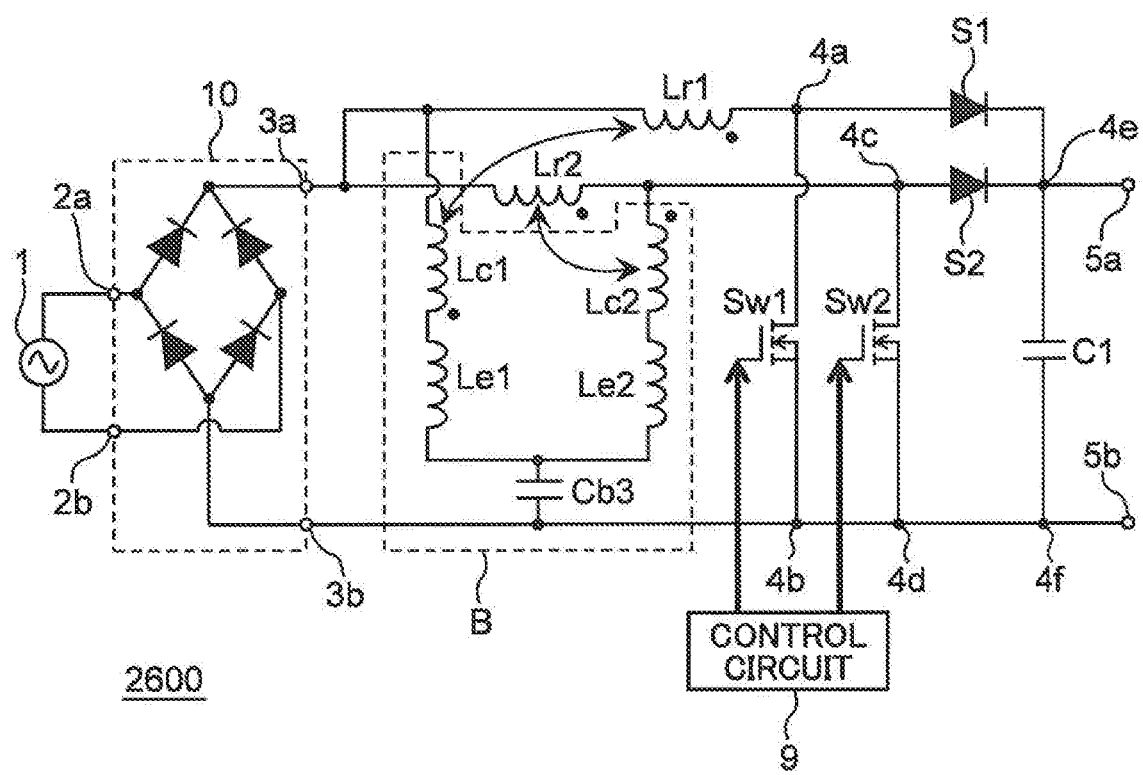
FIG. 21 is a circuit diagram showing a schematic configuration of a power factor improving circuit in a sixth modification of the second embodiment.

A sixth modification of the second embodiment will hereinafter be described. Description overlapping the above description will be omitted as necessary. FIG. 21 is a circuit diagram showing a schematic configuration of a power factor improving circuit 2600 in the sixth modification of the second embodiment.

As shown in FIG. 21, the power factor improving circuit 2600 is different from the power factor improving circuit 2000 (FIG. 8) according to the second embodiment and from the power factor improving circuit 2100 (FIG. 11) according to the first modification of the second embodiment in that the first end of the first inductor Lc1 is connected to the first input terminal 3a while the first end of the second inductor Lc2 is connected to the connection point 4c.

The configuration of the power factor improving circuit 2600 achieves the same effect as achieved by the configuration of the second embodiment.

The power factor improving circuit 2600 may be modified to have the same configuration as the configuration of the power factor improving circuit 2400 (FIG. 19) in which the first bypass inductor Le1 is disposed between the path linking the first input terminal 3a to the first connection point 4a and the first end of the first inductor Lc1.

Alternatively, the power factor improving circuit 2600 may be modified to have the same configuration as the configuration of the power factor improving circuit 2500 (FIG. 20) in which the first bypass inductor Le1 is disposed between the path linking the first input terminal 3a to the first connection point 4a and the first end of the first inductor Lc1 while the second bypass inductor Le2 is disposed between the path linking the first input terminal 3a to the first connection point 4a and the first end of the second inductor Lc2.

Further, the power factor improving circuit 2400 (FIG. 19), the power factor improving circuit 2500 (FIG. 20), the power factor improving circuit 2600 (FIG. 21) and modified configurations of these power factor improving circuits as described above may each further include the first current sensor 91 and the second current sensor 92, similarly to the power factor improving circuit 2300 (FIG. 13). In each of these power factor improving circuits, the control circuit 9 may adjust the switching frequency fsw and the duty ratio of each of the first switching element Sw1 and the second switching element Sw2 in such a way as to minimize each of predetermined frequency components included respectively in the first current value and the second current value.

The first end of the first current sensor 91 may be connected to the second end of the first bypass inductor Le1, while the second end of the first current sensor 91 may be connected to the first end of the bypass capacitor Cb3. The first end of the second current sensor 92 may be connected to the second end of the second bypass inductor Le2, while the second end of the second current sensor 92 may be connected to the first end of the bypass capacitor Cb3. In a configuration not including the first bypass inductor Le1 and the second bypass inductor Le2, the first end of the first current sensor 91 may be connected to the second end of the first inductor Lc1 and the first end of the second current sensor 92 may be connected to the second end of the second inductor Lc2.

In this case, the control circuit 9 adjusts the switching frequency fsw and the duty ratio of each of the first switching element Sw1 and the second switching element Sw2 in such a way as to maximize each of the predetermined frequency components included respectively in the first current value detected by the first current sensor 91 and the second current value detected by the second current sensor 92.

Alternatively, the first end of the first current sensor 91 may be connected to the connection point 4b, while the second end of the first current sensor 91 may be connected to the second end of the first switching element Sw1, and the first end of the second current sensor 92 may be connected to the connection point 4d, while the second end of the second current sensor 92 may be connected to the second end of the second switching element Sw2. In this case, the control circuit 9 adjusts the switching frequency fsw and the duty ratio of each of the first switching element Sw1 and the second switching element Sw2 such that the predetermined frequency components included respectively in the first current value detected by the first current sensor 91 and the second current value detected by the second current sensor 92 become equal with each other.

The configurations of the second embodiment and the modifications thereof raise a concern that even if a ripple component with a frequency two times the switching frequency fsw is reduced by the bypass circuit B, ripple components with frequencies equal to even multiples of the switching frequency fsw and to four times or more the switching frequency fsw may not be reduced sufficiently and, consequently, propagate as a normal mode noise to cause a problem, such as malfunctioning of peripheral circuits. To eliminate this concern, in the configurations of the second embodiment and the modifications thereof, the control circuit 9 may perform so-called frequency spread control to also reduce triangular-wave-shaped ripples with frequencies equal to even multiples of the switching frequency fsw and to four times or more the switching frequency fsw.

In the above configurations, the rectifying section 10 is provided as a diode bridge circuit having four diodes. The configuration of the rectifying section 10 is, however, not limited to this. The rectifying section 10 may be provided as a bridgeless circuit or a totem pole circuit. In the above configurations, the AC power supply 1 and the rectifying section 10 may be replaced with a chopper circuit constructed by connecting a DC power supply to the first input terminal 3a and to the second input terminal 3b.

In the above embodiments, "connection between two elements" (e.g., connection of a certain element to a different element) may refer not only to direct physical connection but also to electrical connection and to connection between two elements across a different element interposed therebetween, the different element being, for example, a wiring line, a resistance element, or the like that does not impair the functions of the embodiments.

The invention claimed is:

1. A power supply circuit comprising:
a first input terminal which is connected to an AC power supply via a rectifying section, the first input terminal directly connected to the rectifying section;
a second input terminal which is connected to an AC power supply via a rectifying section, the second input terminal directly connected to the rectifying section;
a first reactor;
a second reactor;
a first switching element;
a second switching element;
a third switching element;
a fourth switching element;
a first capacitor;
a first output terminal;
a second output terminal;
a control circuit;
a first inductor;
a second inductor; and
a bypass capacitor,
wherein the first input terminal is connected to a first end of the first reactor, a second end of the first reactor is connected to a first end of the third switching element, and a second end of the third switching element is connected to the first output terminal,
the first input terminal is connected to a first end of the second reactor, a second end of the second reactor is connected to a first end of the fourth switching element, and a second end of the fourth switching element is connected to the first output terminal,
the second input terminal is connected to the second output terminal,
a first end of the first switching element is connected to a first connection point on a path linking the second end of the first reactor to the first end of the third switching element, and a second end of the first switching element is connected to the second output terminal,
a first end of the second switching element is connected to a second connection point on a path linking the second end of the second reactor to the first end of the fourth switching element, and a second end of the second switching element is connected to the second output terminal,
a first end of the first capacitor is connected to the first output terminal, and a second end of the first capacitor is connected to the second output terminal,
a first end of the first inductor is directly connected to a path linking the first input terminal to the first connection point, and a second end of the first inductor is directly connected to a first end of the bypass capacitor,
a first end of the second inductor is directly connected to a path linking the first input terminal to the second connection point, and a second end of the second inductor is directly connected to the first end of the bypass capacitor,
a second end of the bypass capacitor is connected to the second output terminal,
the first reactor and the first inductor are magnetically coupled to each other, and the second reactor and the second inductor are magnetically coupled to each other, and the control circuit performs switching control over the first switching element and the second switching element, using an interleaving method.

2. The power supply circuit according to claim 1, further comprising:
a first bypass inductor; and
a second bypass inductor,
wherein the first bypass inductor is disposed between the second end of the first inductor and the first end of the bypass capacitor, and
the second bypass inductor is disposed between the second end of the second inductor and the first end of the bypass capacitor.

3. The power supply circuit according to claim 1, wherein the first end of the first inductor is connected to the first input terminal, and
the first end of the second inductor is connected to the first input terminal.

4. The power supply circuit according to claim 1, wherein the first end of the first inductor is connected to the first connection point, and
the first end of the second inductor is connected to the second connection point.

5. The power supply circuit according to claim 1, further comprising:
a first current sensor; and
a second current sensor,
wherein the first current sensor detects a current value for a current leaving the first output terminal side and flowing through the first reactor into the first input terminal side, and the second current sensor detects a current value for a current leaving the first output terminal and flowing through the second reactor into the first input terminal, and
the control circuit adjusts a switching frequency and a duty ratio of each of the first switching element and the second switching element in such a way as to minimize each of predetermined frequency components included respectively in a first current value detected by the first current sensor and a second current value detected by the second current sensor.

6. The power supply circuit according to claim 5, wherein a first end of the first current sensor is connected to the first input terminal, while a second end of the first current sensor is connected to the first end of the first reactor,
a first end of the second current sensor is connected to the first input terminal, while a second end of the second current sensor is connected to the first end of the second reactor, and
the first current sensor and the second current sensor each detect a current value for a current flowing from the first output terminal side into the first input terminal.

7. The power supply circuit according to claim 1, comprising:
a first bypass inductor; and
a second bypass inductor,
wherein the first bypass inductor is disposed between a path linking the first input terminal to the first connection point and the first end of the first inductor, and
the second bypass inductor is disposed between the second end of the second inductor and a first end of the bypass capacitor.

8. The power supply circuit according to claim 1, comprising:
a first bypass inductor; and
a second bypass inductor,
wherein the first bypass inductor is disposed between a path linking the first input terminal to the first connection point and the first end of the first inductor, and
the second bypass inductor is disposed between the path linking the first input terminal to the first connection point and the first end of the second inductor.

9. A power supply circuit comprising:
a first input terminal;
a second input terminal;
a first reactor;
a second reactor;
a first switching element;
a second switching element;
a third switching element;
a fourth switching element;
a first capacitor;
a first output terminal;
a second output terminal;
a control circuit;
a first inductor;
a second inductor;
a first bypass capacitor; and
a second bypass capacitor,
wherein the first input terminal is connected to a first end of the first reactor, a second end of the first reactor is connected to a first end of the third switching element, and a second end of the third switching element is connected to the first output terminal,
the first input terminal is connected to a first end of the second reactor, a second end of the second reactor is connected to a first end of the fourth switching element, and a second end of the fourth switching element is connected to the first output terminal,
the second input terminal is connected to the second output terminal,
a first end of the first switching element is connected to a first connection point on a path linking the second end of the first reactor to the first end of the third switching element, and a second end of the first switching element is connected to the second output terminal,
a first end of the second switching element is connected to a second connection point on a path linking the second end of the second reactor to the first end of the fourth switching element, and a second end of the second switching element is connected to the second output terminal,
a first end of the first capacitor is connected to the first output terminal, and a second end of the first capacitor is connected to the second output terminal,
a first end of the first inductor is connected to a path linking the first input terminal to the first connection point, a second end of the first inductor is connected to a first end of the first bypass capacitor, and a second end of the first bypass capacitor is connected to the second output terminal,
a first end of the second inductor is connected to a path linking the first input terminal to the second connection point, a second end of the second inductor is connected to a first end of the second bypass capacitor, and a second end of the second bypass capacitor is connected to the second output terminal,
the first reactor and the first inductor are magnetically coupled to each other, and the second reactor and the second inductor are magnetically coupled to each other, and the control circuit performs switching control over the first switching element and the second switching element, using an interleaving method.

10. The power supply circuit according to claim 9, further comprising:
a first bypass inductor; and
a second bypass inductor,
wherein the first bypass inductor is disposed between the second end of the first inductor and the first end of the first bypass capacitor, and
the second bypass inductor is disposed between the second end of the second inductor and the first end of the second bypass capacitor.

\* \* \* \* \*